United States Patent
Ito et al.

(10) Patent No.: US 9,461,299 B2
(45) Date of Patent: *Oct. 4, 2016

(54) TRANSITION METAL OXIDE CONTAINING SOLID SOLUTION LITHIUM, NON-AQUEOUS ELECTROLYTE SECONDARY BATTERY POSITIVE ELECTRODE AND NON-AQUEOUS ELECTROLYTE SECONDARY BATTERY

(71) Applicant: NISSAN MOTOR CO., LTD., Kanagawa (JP)

(72) Inventors: Atsushi Ito, Ebina (JP); Yasuhiko Ohsawa, Yokosuka (JP); Tomohiro Kaburagi, Yokohama (JP); Shinji Yamamoto, Yokosuka (JP); Kenzo Oshihara, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 151 days.

This patent is subject to a terminal disclaimer.

(21) Appl. No.: 14/374,607

(22) PCT Filed: Feb. 1, 2013

(86) PCT No.: PCT/JP2013/052414
§ 371 (c)(1),
(2) Date: Jul. 25, 2014

(87) PCT Pub. No.: WO2013/115390
PCT Pub. Date: Aug. 8, 2013

(65) Prior Publication Data
US 2014/0356718 A1  Dec. 4, 2014

(30) Foreign Application Priority Data

Feb. 1, 2012 (JP) .................. 2012-019849
Feb. 1, 2012 (JP) .................. 2012-019857
Feb. 1, 2012 (JP) .................. 2012-019873
Feb. 1, 2012 (JP) .................. 2012-019876
Feb. 1, 2013 (JP) .................. 2013-018282

(51) Int. Cl.
| H01M 4/131 | (2010.01) |
| H01M 4/505 | (2010.01) |
| H01M 4/525 | (2010.01) |
| C01G 53/00 | (2006.01) |
| H01M 4/36 | (2006.01) |
| H01M 4/485 | (2010.01) |
| H01M 4/1391 | (2010.01) |
| H01M 4/02 | (2006.01) |

(52) U.S. Cl.
CPC .............. *H01M 4/131* (2013.01); *C01G 53/56* (2013.01); *H01M 4/1391* (2013.01); *H01M 4/362* (2013.01); *H01M 4/366* (2013.01); *H01M 4/485* (2013.01); *H01M 4/505* (2013.01); *H01M 4/525* (2013.01); *C01P 2002/32* (2013.01); *C01P 2004/61* (2013.01); *C01P 2006/10* (2013.01); *C01P 2006/12* (2013.01); *C01P 2006/14* (2013.01); *C01P 2006/40* (2013.01); *H01M 2004/028* (2013.01); *H01M 2220/20* (2013.01); *Y02E 60/122* (2013.01)

(58) Field of Classification Search
CPC .... H01M 4/131; H01M 4/366; H01M 4/485; H01M 4/502; H01M 4/525; H01M 2004/028
See application file for complete search history.

(56) References Cited

U.S. PATENT DOCUMENTS

| 7,368,071 | B2 | 5/2008 | Dahn et al. |
| 8,354,192 | B2 | 1/2013 | Imanari |
| 2003/0108793 | A1 | 6/2003 | Dahn et al. |
| 2008/0014498 | A1 | 1/2008 | Ogawa et al. |
| 2008/0085452 | A1* | 4/2008 | Park ........................ 429/220 |
| 2011/0151327 | A1 | 6/2011 | Imanari |
| 2013/0337332 | A1* | 12/2013 | Ito et al. ................. 429/223 |
| 2014/0131633 | A1 | 5/2014 | Ito et al. |
| 2015/0008363 | A1* | 1/2015 | Kaburagi et al. ......... 252/182.1 |
| 2015/0014583 | A1* | 1/2015 | Kaburagi et al. ............ 252/184 |
| 2015/0034864 | A1* | 2/2015 | Ito et al. .................. 252/182.1 |
| 2015/0079463 | A1* | 3/2015 | Yamamoto et al. ......... 429/188 |
| 2015/0079475 | A1* | 3/2015 | Yamamoto et al. ......... 429/223 |
| 2015/0132652 | A1* | 5/2015 | Ito et al. .................. 429/223 |
| 2015/0155555 | A1* | 6/2015 | Yamamoto et al. |

FOREIGN PATENT DOCUMENTS

| CN | 102187501 A | 9/2011 |
| EP | 2731180 A1 | 5/2014 |

(Continued)

OTHER PUBLICATIONS

Machine translation of JP 2012-186035, filed on Sep. 27, 2012.*
Zhonghua Lu, D.D. MacNeil, J.R. Dahn-Layered Cathode Materials Li(nixLi(1/3-2x/3)MN(2/3-x/3))O2 for Lithium-Ion Batteries, Electrochemical and Solid-State Letters, 4 (11), A191-A194, 2001.*

(Continued)

*Primary Examiner* — Anca Eoff
(74) *Attorney, Agent, or Firm* — Young Basile Hanlon & MacFarlane, P.C.

(57) ABSTRACT

A transition metal oxide containing solid solution lithium contains a transition metal oxide containing lithium, which is represented by a chemical formula: $Li_{1.5}[Ni_aCo_bMn_c[Li]_d]O_3$ where $0<a<1.4$; $0\leq b<1.4$; $0<c<1.4$; $0.1<d\leq 0.4$; $a+b+c+d=1.5$; and $1.1\leq a+b+c<1.4$. The transition metal oxide containing lithium includes: a layered structure region; and a region changed to a spinel structure by being subjected to charge or charge/discharge in a predetermined potential range. When a ratio of an entire change from $Li_2MnO_3$ with a layered structure in a region to be changed to the spinel structure to $LiMn_2O_4$ with the spinel structure is defined to be 1, a spinel structure change ratio of the transition metal oxide containing lithium is 0.25 or more to less than 1.0.

13 Claims, 6 Drawing Sheets

(56) References Cited

FOREIGN PATENT DOCUMENTS

| | | | |
|---|---|---|---|
| JP | 2004-538610 A | | 12/2004 |
| JP | 2008-021614 A | | 1/2008 |
| JP | 2010-103086 A | | 5/2010 |
| JP | 2011-225450 A | | 11/2011 |
| JP | 2012-186035 | * | 9/2012 |
| KR | 2010-0131921 A | | 12/2010 |
| WO | WO2012/121062 | * | 9/2012 |
| WO | 2014024571 A1 | | 2/2014 |

OTHER PUBLICATIONS

S H Park, S H Kang, C.S. Johnson, K. Amine, M.M. Thackeray-Lithium-manganese-nickel-oxide electrodes with integrated layered-spinel structures for lithium batteries, Electrochemistry Communications 9, , pp. 262-268, 2007.*

Communication with extended European search report dated Jan. 28, 2015 from the corresponding European application No. 13744386.7.

* cited by examiner

TRANSITION METAL OXIDE CONTAINING SOLID SOLUTION LITHIUM, NON-AQUEOUS ELECTROLYTE SECONDARY BATTERY POSITIVE ELECTRODE AND NON-AQUEOUS ELECTROLYTE SECONDARY BATTERY

CROSS REFERENCE TO RELATED APPLICATIONS

The present application claims priority to Japanese Patent Application No. 2012-019849 (filed on: Feb. 1, 2012), Japanese Patent Application No. 2012-019857 (filed on: Feb. 1, 2012), Japanese Patent Application No. 2012-019873 (filed on: Feb. 1, 2012), Japanese Patent Application No. 2012-019876 (filed on: Feb. 1, 2012) and Japanese Patent Application No. 2013-018282 (filed on: Feb. 1, 2013); each incorporated herein by reference in its entirety.

TECHNICAL FIELD

The present invention relates to a transition metal oxide containing solid solution lithium, and to a non-aqueous electrolyte secondary battery positive electrode and a non-aqueous electrolyte secondary battery, which use the same.

BACKGROUND

In recent years, it has been sincerely desired that the emission amount of carbon dioxide be reduced in order to cope with the air pollution and the global warming. In the automobile industry, expectations have been centered on such reduction of the emission amount of carbon dioxide by introduction of the electric vehicle (EV) and the hybrid electric vehicle (HEV). Therefore, development of an electric device such as a secondary battery for driving a motor, the electric device serving as a key for practical use of these vehicles, has been assiduously pursued.

As the secondary battery for driving a motor, a lithium ion secondary battery having high theoretical energy attracts attention, and at present, development thereof progresses rapidly. In general, the lithium ion secondary battery has a configuration in which a positive electrode, a negative electrode and an electrolyte located there between are housed in a battery case. Note that the positive electrode is formed by coating a surface of a current collector with positive electrode slurry containing a positive electrode active material, and the negative electrode is formed by coating a surface of a negative electrode current collector with negative electrode slurry containing a negative electrode active material.

Then, in order to enhance capacity characteristics, output characteristics and the like of the lithium ion secondary battery, selection of the respective active materials is extremely important.

Heretofore, a lithium ion battery cathode composition, which has Formula (a) $Li_y[M^1_{(1-b)}Mn_b]O_2$ or Formula (b) $Li_x[M^1_{(1-b)}Mn_b]O_{1.5+c}$, has been proposed (for example, refer to Japanese Unexamined Patent Application Publication No. 2004-538610). Note that, in the formulae, y ranges like: $0 \leq y < 1$; b ranges like $0 < b < 1$; and c ranges like: $0 < c < 0.5$. $M^1$ represents one or more of metallic elements. However, in a case of Formula (a), $M^1$ is a metallic element other than chromium. Then, this composition has a single-phase form having an O3 crystal structure that does not cause phase transition to a spinel crystal structure when a cycle operation of a predetermined complete charge/discharge cycle is performed.

SUMMARY

However, as a result of examinations by the inventors of the present invention, there has been a problem that even a lithium ion secondary battery using the cathode composition of Japanese Unexamined Patent Application Publication No. 2004-538610 cannot realize high discharge capacity and capacity retention ratio.

The present invention has been made in consideration of the problems as described above, which are inherent in the conventional technology. Then, it is an object of the present invention to provide a transition metal oxide containing solid solution lithium, which is capable of realizing high initial discharge capacity and capacity retention ratio, and to provide a non-aqueous electrolyte secondary battery positive electrode and a non-aqueous electrolyte secondary battery, which use the same.

A transition metal oxide containing solid solution lithium according to an aspect of the present invention contains a transition metal oxide containing lithium, which is represented by a chemical formula:

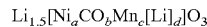

$$Li_{1.5}[Ni_aCo_bMn_c[Li]_d]O_3$$

(where Li is lithium, Ni is nickel, Co is cobalt, Mn is manganese, O is oxygen, a, b, c and d satisfy relationships: $0<a<1.4$; $0 \leq b<1.4$; $0<c<1.4$; $0.1<d \leq 0.4$; $a+b+c+d=1.5$; and $1.1 \leq a+b+c<1.4$).

The transition metal oxide containing lithium includes: a layered structure region; and a region changed to a spinel structure by being subjected to charge or charge/discharge in a predetermined potential range. When a ratio of an entire change from $Li_2MnO_3$ with a layered structure in a region to be changed to the spinel structure to $LiMn_2O_4$ with the spinel structure is defined to be 1, a spinel structure change ratio of the transition metal oxide containing lithium is 0.25 or more to less than 1.0.

DESCRIPTION OF EMBODIMENTS

Figure 1:
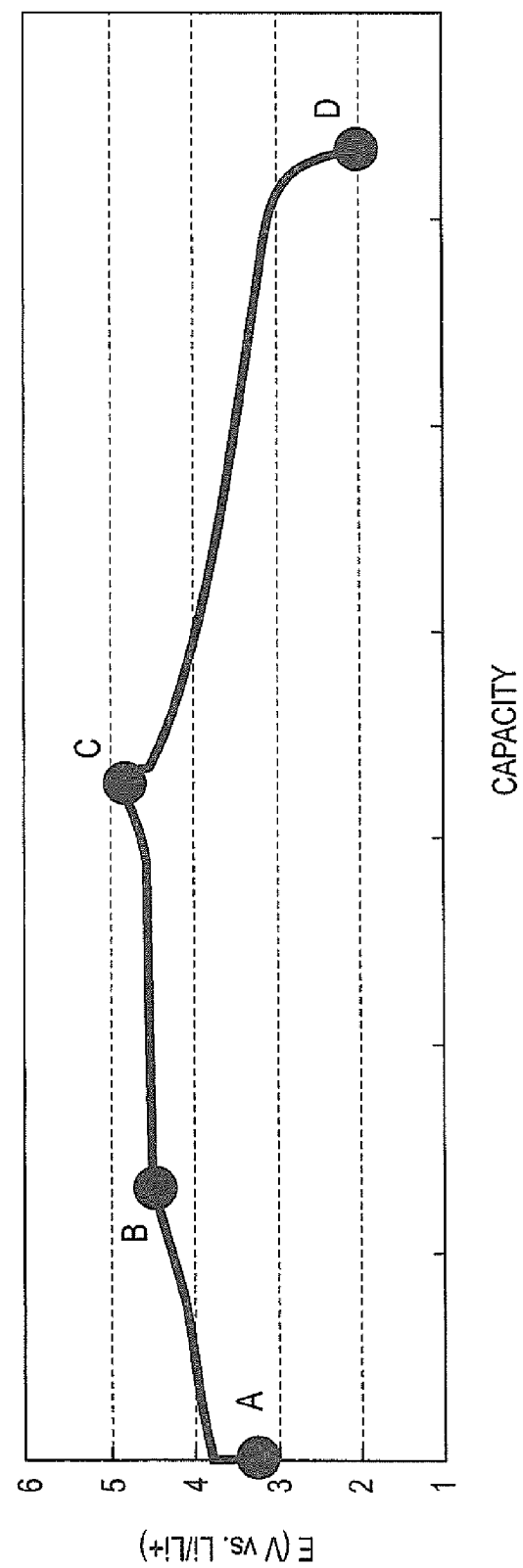
FIG. 1 is a graph explaining a definition of a spinel structure change ratio.

A description is made in detail of a transition metal oxide containing solid solution lithium, a non-aqueous electrolyte secondary battery positive electrode and a non-aqueous electrolyte secondary battery according to the present invention. Note that the present invention is not limited only to the following embodiments. Moreover, dimensional ratios of the drawings are exaggerated for convenience of explanation, and are sometimes different from actual ratios.

Suitably, the transition metal oxide containing solid solution lithium according to the present invention is used, for example, as a positive electrode active material of a lithium ion secondary battery that is a non-aqueous electrolyte secondary battery. Accordingly, with regard to the non-aqueous electrolyte secondary battery positive electrode and the non-aqueous electrolyte secondary battery according to embodiments of the present invention, a description thereof is made by taking as examples a lithium ion secondary battery positive electrode and a lithium ion secondary battery.

First Embodiment

A transition metal oxide containing solid solution lithium according to this embodiment contains a transition metal oxide containing lithium (hereinafter, also simply referred to as a transition metal oxide) represented by Chemical formula (1).

$$Li_{1.5}[Ni_aCo_bMn_c[Li]_d]O_3 \quad (1)$$

In Formula (1), Li denotes lithium, Ni denotes nickel, Co denotes cobalt, Mn denotes manganese, and O denotes oxygen. Moreover, a, b, c and d satisfy relationships: $0<a<1.4$; $0\leq b<1.4$; $0<c<1.4$; $0.1<d\leq 0.4$; $a+b+c+d=1.5$; and $1.1\leq a+b+c<1.4$.

Then, the transition metal oxide containing lithium according to this embodiment includes: a layered structure region; and a region ($Li_2MnO_3$ with a layered structure) changed to a spinel structure by being subjected to charge or charge/discharge in a predetermined potential range.

Moreover, such $Li_2MnO_3$ with the layered structure in the transition metal oxide containing lithium is changed to $LiMn_2O_4$ with a spinel structure. Then, when a ratio of the entire change from $Li_2MnO_3$ with the layered structure to $LiMn_2O_4$ with the spinel structure is defined to be 1, a spinel structure change ratio of the transition metal oxide containing lithium is 0.25 or more to less than 1.0.

In a case of being used as the positive electrode active material of the lithium ion secondary battery, the transition metal oxide containing solid solution lithium, which is as described above, is capable of realizing high discharge capacity and capacity retention ratio, and accordingly, is suitably used as the lithium ion secondary battery positive electrode and the lithium ion secondary battery. As a result, the transition metal oxide containing solid solution lithium can be suitably used for a lithium ion secondary battery for a drive power supply or auxiliary power supply of a vehicle. Besides, the transition metal oxide containing solid solution lithium is sufficiently applicable also to a lithium ion secondary battery for home or a portable instrument.

In the transition metal oxide containing lithium according to this embodiment, it is necessary that a, b, c and d satisfy relationships: $0<a<1.4$; $0\leq b<1.4$; $0<c<1.4$; $0.1<d\leq 0.4$; $a+b+c+d=1.5$; and $1.1\leq a+b+c<1.4$ in Chemical formula (1). In a case where such mathematical formulas are not satisfied, then there is a possibility that a crystal structure of the transition metal oxide containing lithium may not be stabilized.

Here, the "spinel structure change ratio" in this specification prescribes a change ratio from $Li_2MnO_3$ with the layered structure in the transition metal oxide containing lithium to $LiMn_2O_4$ with the spinel structure in the case where the transition metal oxide containing lithium performs such charge or such charge/discharge in the predetermined potential range. That is to say, the transition metal oxide containing lithium in this embodiment includes: $Li_2MnO_3$ with the layered structure changed to the spinel structure by performing the charge or the charge/discharge in the predetermined potential range; and a layered structure region ($LiMO_2$) that is not changed to the spinel structure thereby. Then, the spinel structure change ratio in the case where $Li_2MnO_3$ with the layered structure in the transition metal oxide containing lithium is entirely changed to $LiMn_2O_4$ with the spinel structure is defined to be 1. Note that the "predetermined potential range" can be set, for example, at 4.3 to 4.8V. Specifically, the spinel structure change ratio is defined by the following Equation 1.

$$\begin{bmatrix} \text{Spinel structure} \\ \text{change ratio}(K) \end{bmatrix} = \frac{\begin{bmatrix} \text{actual capacity} \\ \text{of plateau region} \end{bmatrix}}{\begin{bmatrix} \text{theoretical capacity} \\ \text{caused by } Li_2MnO_3 \\ \text{in transition metal oxide}(V_S) \end{bmatrix} \times \begin{bmatrix} \text{Composition ratio} \\ \text{of } Li_2MnO_3 \\ \text{in transition meal oxide}(x) \end{bmatrix}}$$

A description is made of the definition of the "spinel structure change ratio" by taking the case shown in FIG. 1 as an example. FIG. 1 is a graph showing a relationship between a potential and a capacity for a battery assembled by using a positive electrode in which the transition metal oxide containing lithium is used as the positive electrode active material. With regard to the battery, a state where the battery is charged to 4.5V from an initial state A before the charge is started is defined as a charge state B. Moreover, a state where the battery is charged to 4.8V from the charge state B through a plateau region is defined as an overcharge state C, and further, a state where the battery is discharged to 2.0V is defined as a discharge state D. Then, for the "actual capacity of plateau region" in Equation 1 described above, an actual capacity of the transition metal oxide containing lithium in the plateau region of FIG. 1 just needs to be measured. Note that, specifically, the plateau region is a region from 4.5V to 4.8V, and is a region caused by the fact that the crystal structure is changed. Therefore, an actual capacity $V_{BC}$ of the battery in a region BC from the charge state B to the overcharge state C corresponds to the actual capacity of the plateau region.

In actual, in the transition metal oxide of Chemical formula (1), an actual capacity $V_{AB}$ of a region AB from the initial state A to the charge state B where the battery is charged to 4.5V corresponds to a product of a composition ratio of $LiMO_2$ (y) with the layer like structure, which is not changed to the spinel structure, and a theoretical capacity of $LiMO_2$ ($V_L$). Moreover, the actual capacity $V_{BC}$ in the region BC from the charge state B where the battery is charged to 4.5V to the overcharge state C where the battery is charged to 4.8V corresponds to a product of the composition ratio of $Li_2MnO_3$ (x) as the spinel structure region and a theoretical capacity of $Li_2MnO_3$ ($V_s$). Therefore, when an actual capacity ($V_T$) measured from the initial state A to such a predetermined plateau region is defined as ($V_T=V_{AB}+V_{BC}$), the spinel structure change ratio can be calculated by using the following Equation 2 since relationships: $V_{AB}=y\times(V_L)$; and $V_{BC}=x\times(V_S)\times K$ are established. Note that M in the above-mentioned Chemical formula $LiMO_2$ denotes at least one selected from the group consisting of nickel (Ni), cobalt (Co) and manganese (Mn).

$$\begin{bmatrix} \text{Spinel structure} \\ \text{change ratio}(K) \end{bmatrix} = \frac{\begin{bmatrix} \text{actual capacity} \\ \text{measured to} \\ \text{plateau region}(V_T) \end{bmatrix} - \begin{bmatrix} \text{theoretical capacity} \\ \text{caused by } LiMO_2 \text{ in} \\ \text{transition metal oxide}(V_L) \end{bmatrix} \times \begin{bmatrix} \text{composition ratio} \\ \text{of } LiMO_2 \\ \text{in transition} \\ \text{metal oxide}(y) \end{bmatrix}}{\begin{bmatrix} \text{theoretical capacity} \\ \text{caused by } Li_2MnO_3 \text{ in} \\ \text{transition metal oxide}(V_S) \end{bmatrix} \times \begin{bmatrix} \text{composition ratio} \\ \text{of } Li_2MnO_3 \text{ in} \\ \text{transition metal oxide}(x) \end{bmatrix}}$$

Note that the "composition ratio of $Li_2MnO_3$ in transition metal oxide containing lithium" can be calculated from Chemical formula (1) for the transition metal oxide containing lithium. Specifically, in a case of a positive electrode active material 7 ($Li_{1.5}[Ni_{0.2}Co_{0.2}Mn_{0.8}[Li]_{0.3}]O_3(a+b+c+d=1.5, d=0.3, a+b+c=1.2)$) of Example 1-7 to be described later, the composition ratio of $Li_2MnO_3$ becomes 0.6 pursuant to Chemical formula (1). Moreover, a composition ratio of $LiNi_{1/3}Mn_{1/3}CO_{1/3}O_2$ ($=Li_{1.5}Ni_{0.5}Mn_{0.5}CO_{0.5}O_3$) becomes 0.4.

It can be determined whether or not the layered structure region ($LiMO_2$), which is not changed to the spinel structure region, and the spinel structure region ($Li_2MnO_3$) $Li_2MnO_3$ are present in the transition metal oxide containing lithium based on presence of peaks unique to the layered structure region and the spinel structure, which can be observed by X-ray diffraction analysis (XRD). Moreover, the ratio of the layered structure region and the spinel structure region can be determined based on the capacity measurement/calculation as mentioned above.

In the transition metal oxide containing lithium, the spinel structure change ratio does not become 1.0. That is to say, $Li_2MnO_3$ with the layered structure in the transition metal oxide containing lithium is not entirely changed to the $LiMn_2O_4$ with the spinel structure. Moreover, in a case where the spinel structure change ratio is less than 0.25, then what is obtained is only a transition metal oxide containing solid solution lithium, which is capable of realizing a discharge capacity and a capacity retention ratio, of which degrees are no larger than the conventional ones.

Note that, in this specification, the "charge" refers to an operation of increasing a potential difference between electrodes continuously or stepwise. Moreover, the "charge/discharge" refers to an operation of reducing the potential difference between the electrodes continuously or stepwise after the operation of increasing the potential difference between the electrodes continuously or stepwise, or refers to an operation of appropriately repeating these operations.

In Chemical formula (1), preferably, a, b, c, and d satisfy relationships: $0<a<1.35$; $0≤b<1.35$; $0<c<1.35$; $0.15<d≤0.35$; $a+b+c+d=1.5$; and $1.15≤a+b+c<1.35$. Moreover, in the case where the charge or the charge/discharge in the predetermined potential range is performed, suitably, the spinel structure change ratio of the transition metal oxide containing lithium is 0.4 or more to less than 0.9. In a case of using the transition metal oxide containing solid solution lithium, which is as described above, for the positive electrode active material, then it becomes possible to obtain higher discharge capacity and capacity retention ratio.

Moreover, in Chemical formula (1), more preferably, a, b, c, and d satisfy relationships: $0<a<1.3$; $0≤b<1.3$; $0<c<1.3$; $0.15<d≤0.35$; $a+b+c+d=1.5$; and $1.2≤a+b+c<1.3$. Furthermore, in the case where the charge or the charge/discharge in the predetermined potential range is performed, more suitably, the spinel structure change ratio of the transition metal oxide containing lithium is 0.6 or more to 0.8 or less.

In a case of being used as the positive electrode active material for the lithium ion secondary battery, the transition metal oxide containing solid solution lithium, which is as described above, is capable of realizing higher discharge capacity and capacity retention ratio, and accordingly, is more suitably used for the lithium ion secondary battery positive electrode and the lithium ion secondary battery.

Next, a description is made of a production method of the transition metal oxide containing solid solution lithium (transition metal oxide containing lithium) according to the first embodiment of the present invention.

First, as a precursor of the transition metal oxide containing lithium, a mixture is prepared by mixing raw materials with one another, which contain a lithium compound, a nickel compound, a cobalt compound and a manganese compound such as sulfates and nitrates. Subsequently, the obtained mixture is calcined at 800 to 1000° C. for 6 to 24 hours under an inert gas atmosphere. In such a way, the transition metal oxide containing lithium can be prepared. Note that it is preferable to use nitrogen and argon as the inert gas.

Moreover, as another production method, first, as the precursor of the transition metal oxide containing lithium, a mixture is prepared by mixing raw materials with one another, which contain a lithium compound, a nickel compound, a cobalt compound and a manganese compound such as sulfates and nitrates. Subsequently, the obtained mixture is calcined at 800 to 1000° C. for 6 to 24 hours, whereby a calcined product is obtained. Thereafter, the calcined product thus obtained is subjected to heat treatment at 600 to 800° C. under an inert gas atmosphere. In such a way, the transition metal oxide containing lithium can be prepared.

Note that, in order to obtain a desired spinel structure change ratio, preferably, treatment as described below is performed. Though details are described later, in the lithium ion secondary battery using the above-described transition metal oxide containing solid solution lithium for the positive electrode, charge or charge/discharge, in which a maximum potential of the positive electrode in the predetermined potential range is 4.3V or more to less than 4.8V in conversion to a lithium metal counter electrode (electrochemical pretreatment), is performed. In such a way, the transition metal oxide containing solid solution lithium, in which the spinel structure change ratio is 0.25 or more to less than 1.0, can be obtained.

A description is made more in detail of the production method of the transition metal oxide containing solid solution lithium according to this embodiment.

As such a production method of the precursor of the transition metal oxide containing lithium, a carbonate method (composite carbonate method) can be applied. Specifically, first, as starting materials, the respective sulfates, nitrates and the like of nickel, cobalt and manganese are prepared, and these are weighed by predetermined amounts, and thereafter, a mixed aqueous solution is prepared.

Subsequently, ammonia water is dropped into this mixed aqueous solution until pH thereof can be 7, and further, an aqueous solution of sodium carbonate ($Na_2CO_3$) is dropped thereinto, whereby composite carbonate of Ni—Co—Mn is precipitated. Note that, while the aqueous solution of $Na_2CO_3$ is being dropped, pH of the mixed aqueous solution is maintained at 7 by using the ammonia water.

Then, the precipitated composite carbonate is aspirated and filtrated, is washed with water, and thereafter, is dried, and is temporarily calcined. With regard to drying conditions, the composite carbonate just needs to be dried at 100 to 150° C. for about 2 to 10 hours (for example, at 120° C. for 5 hours) in an inert gas atmosphere; however the drying conditions are not limited to these ranges. With regard to such temporary calcination conditions, the composite carbonate just needs to be temporarily calcined at 360 to 600° C. for 3 to 10 hours (for example, at 500° C. for 5 hours) in an inert gas atmosphere; however, the temporary calcination conditions are not limited to these ranges.

Moreover, to powder thus temporarily calcined, a little superfluous lithium hydroxide ($LiOH.H_2O$) is added and mixed. Thereafter, a resultant is mainly calcined, whereby the precursor of the transition metal oxide containing lithium can be prepared. With regard to the main calcination conditions, for example, the resultant just needs to be mainly calcined, for example, at 800 to 1000° C. (for example, 800 to 900° C.) for about 6 to 24 hours (for example, 12 hours) in an inert gas atmosphere. Note that, preferably, the resultant is quickly cooled by using liquid nitrogen after being mainly calcined. This is because such quick cooling using liquid nitrogen and the like after such main calcination is preferable for reactivity and cycle stability.

Then, the transition metal oxide containing solid solution lithium according to this embodiment can be obtained by performing oxidation treatment for the above-described precursor. As the oxidation treatment, for example, there can be mentioned: (1) charge or charge/discharge in predetermined potential range (electrochemical pretreatment, charge/discharge pretreatment; (2) oxidation by oxidant ready for charge; (3) oxidation using redox mediator; and the like. Here, (1) charge or charge/discharge in predetermined potential range specifically refers to charge or charge/discharge from a low potential range in which a large change of the crystal structure of the transition metal oxide containing lithium is not brought about from the beginning. Moreover, as (2) oxidant ready for charge, for example, halogens of bromine, chlorine and the like can be mentioned.

Here, a relatively simple method among the above-described (1) to (3) oxidation treatments is an oxidation treatment method of the above-described (1). Then, as the oxidation treatment of (1), effective is charge or charge/discharge, which is performed so that the potential cannot exceed a predetermined maximum potential, after the battery is fabricated by using the precursor of the transition metal oxide containing lithium, which is obtained as mentioned above, that is, effective is charge/discharge pretreatment in which the potential is regulated. Note that the charge or the charge/discharge may be performed so that the potential cannot exceed the predetermined maximum potential after the positive electrode or a structure corresponding to the positive electrode is fabricated by using the precursor of the transition metal oxide containing lithium, which is obtained as mentioned above. In such a way, such a positive electrode active material, in which the high discharge capacity and capacity retention ratio are realized, can be obtained.

As such an electrochemical pretreatment method in which the potential is regulated, desirably, the charge/discharge is performed for 1 to 30 cycles under conditions where a maximum potential (upper limit potential of the charge/discharge, which is converted to lithium metal) in a predetermined potential range for lithium metal as a counter electrode becomes 4.3V or more to 4.8V or less. Desirably, the charge/discharge is performed for 1 to 30 cycles under conditions where the maximum potential becomes, more preferably, 4.4V or more to 4.6V or less. The oxidation treatment by the charge/discharge is performed within the above-described potential range, whereby the high charge capacity and capacity retention ratio can be realized. Note that the above-described potential converted to the lithium metal corresponds to a potential, which takes, as a reference, a potential shown by the lithium metal in an electrolytic solution in which lithium ions are dissolved by 1 mol/L.

Moreover, after the charge/discharge within the above-described predetermined potential range for the lithium metal as the counter electrode is performed for 1 to 30 cycles, desirably, the maximum potential of the predetermined potential range in the charge/discharge is further increased stepwise. In particular, in the case of using the transition metal oxide containing lithium to a capacity component with such a potential as high as 4.7V and 4.8V vs. Li, the maximum potential of such a charge/discharge potential in the oxidation treatment is increased stepwise, whereby durability of the electrode can be improved even in oxidation treatment for a short time.

In the event of increasing the maximum potential (upper limit potential) of the charge/discharge stepwise, the number of cycles required for the charge/discharge in each step is, effectively, within a range of 1 to 10 times. Moreover, the total number of charge/discharge cycles in the event of increasing the maximum potential of the charge/discharge stepwise, that is, the number of times, which is obtained by summing up the number of cycles required for the charge/discharge in each step is, effectively, within a range of 4 times to 20 times.

Moreover, in the event of increasing the maximum potential of the charge/discharge stepwise, a gain (increase margin) of the potential in each step is, effectively, 0.05V to 0.1V.

Furthermore, in the event of increasing the maximum potential of the charge/discharge stepwise, effectively, a final maximum potential (termination maximum potential) is set at 4.6V to 4.9V. However, the termination maximum potential is not limited to the above-described range, and the electrochemical pretreatment may be performed up to a higher termination maximum potential if the above-described effects can be exerted.

A minimum potential of the predetermined potential range of the charge/discharge is 2V or more to less than 3.5V, more preferably, 2V or more to less than 3V for the lithium metal as the counter electrode. The oxidation treatment by the charge or the charge/discharge is performed within the above-described range, whereby the high charge capacity and capacity retention ratio can be realized. Note that the potential (V) of the above-described charge/discharge refers to a potential per single cell.

A temperature of the electrode that performs the charge/discharge as the oxidation treatment can be set arbitrarily as long as the functions and effects of the present invention are not damaged. Note that, from a viewpoint of economy, desirably, the oxidation treatment is performed at room temperature (25° C.) at which special heating and cooling are not required. Meanwhile, from viewpoints that a larger capacity can be developed, and that the capacity retention ratio is enhanced by short-time charge/discharge treatment, desirably, the oxidation treatment is performed at a temperature higher than the room temperature.

A process to which the oxidation treatment (electrochemical pretreatment) is applied is not particularly limited. For example, the oxidation treatment as described above can be performed as described above in the state where the battery is configured or in the positive electrode or in the configuration corresponding to the electrode. That is to say, the oxidation treatment may be applied in any of the state of the powder of the positive electrode active material, the state of the positive electrode, and a state after the assembly of the battery in combination with a negative electrode. In the event of application of the oxidation treatment to the battery, preferably, conditions of the oxidation treatment are decided in consideration of a potential profile of an electric capacity of the negative electrode to be combined with the positive electrode concerned.

Here, a case of the state where the battery is configured is superior to implementation of the oxidation treatment for each positive electrode or for each configuration corresponding to the electrode in that the oxidation treatment for many positive electrodes can be performed once and collectively. Meanwhile, in a case of performing the oxidation treatment for each of the positive electrodes or for each of the configurations corresponding to the positive electrode, it is easier to control the conditions for the oxidation potential and the like than in the state of configuring the battery. Furthermore, such a method of performing the oxidation treatment for each of the positive electrodes is excellent in that variations in degree of oxidation to the individual electrodes are less likely to occur.

Note that, as the oxidant for use in the oxidation treatment method of (2) described above, for example, halogens of bromine, chlorine and the like can be used. These oxidants may be each used singly or may be used in combination. With regard to the oxidation by the oxidant, for example, fine particles of the transition metal oxide containing lithium are dispersed into a solvent into which the transition metal oxide containing lithium is not dissolved, and the oxidant is blown into a dispersion solution concerned, whereby the transition metal oxide containing lithium can be gradually oxidized.

Next, a description is made in detail of the lithium ion secondary battery positive electrode and the lithium ion secondary battery according to the first embodiment of the present invention while referring to the drawings.

Figure 2:
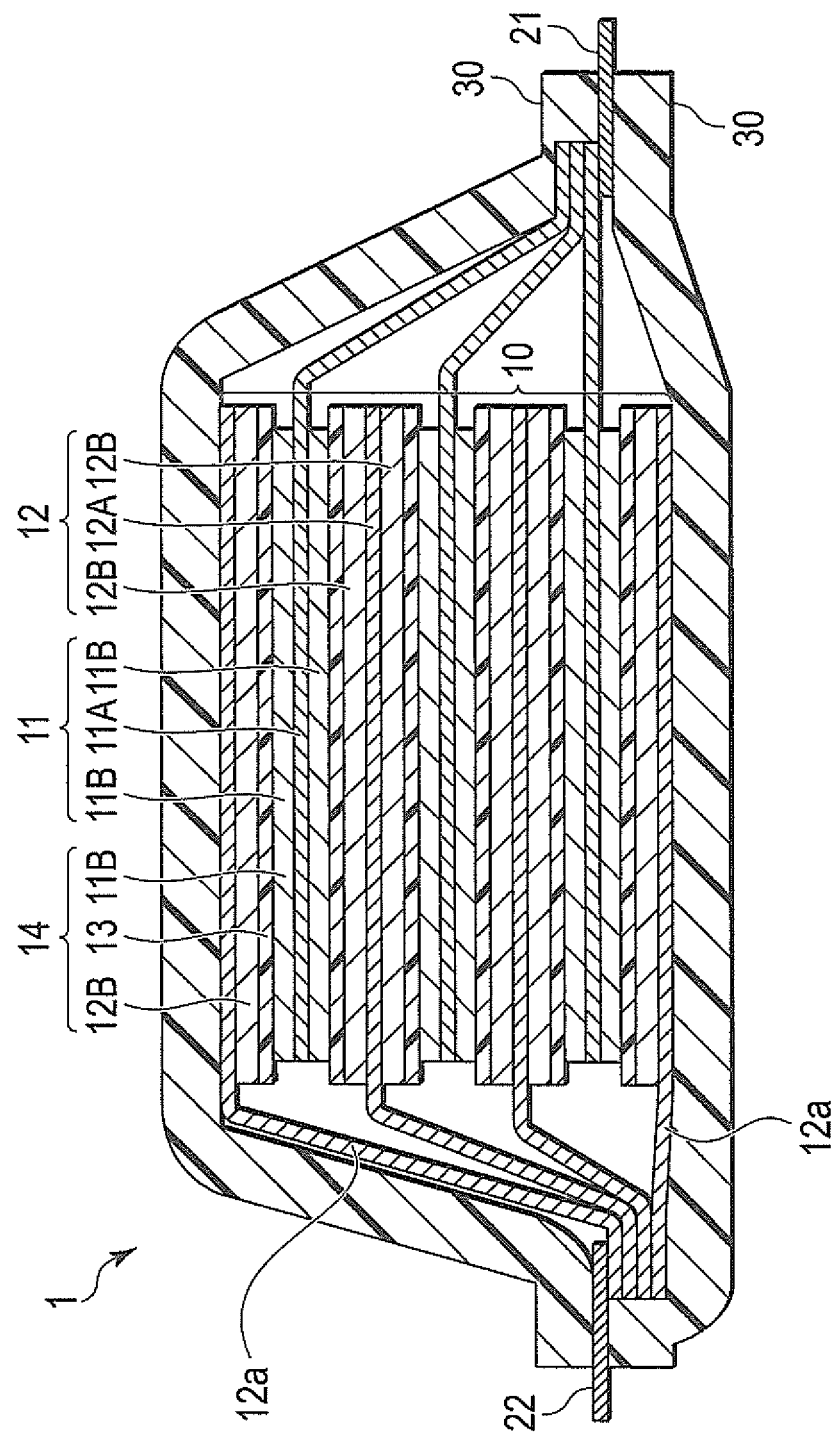
FIG. 2 is a schematic cross-sectional view showing an example of a lithium ion secondary battery according to embodiments of the present invention.

FIG. 2 shows an example of the lithium ion secondary battery according to the first embodiment of the present invention. Note that the lithium ion secondary battery as described above is called a laminate-type lithium ion secondary battery.

As shown in FIG. 2, a lithium ion secondary battery 1 of this embodiment has a configuration in which a battery element 10 attached with a positive electrode lead 21 and a negative electrode lead 22 is enclosed in an inside of an outer jacket 30 formed of a laminated film. Then, in this embodiment, the positive electrode lead 21 and the negative electrode lead 22 are drawn out in opposite directions to each other from the inside of the outer jacket 30 to an outside thereof. Note that, though not shown, the positive electrode lead and the negative electrode lead may be drawn out in the same direction from the inside of the outer jacket to the outside thereof. Moreover, the positive electrode lead and the negative electrode lead, which are as described above, can be attached onto positive electrode current collectors and negative electrode current collectors, which are to be described later, for example, by ultrasonic welding, resistance welding and the like.

[Positive Electrode Lead and Negative Electrode Lead]

The positive electrode lead 21 and the negative electrode lead 22 are composed, for example, of a metal material such as aluminum (Al), copper (Cu), titanium (Ti), nickel (Ni), alloys thereof and stainless steel (SUS). However, the metal material is not limited to these, and materials, which have been heretofore known in public and are used as the leads for the lithium ion secondary battery, can be used. Note that, as the positive electrode lead and the negative electrode lead, those formed of the same material may be used, or those formed of different materials may be used.

Moreover, as in this embodiment, the leads, which are prepared separately, may be connected to the positive electrode current collectors and the negative electrode current collectors, or alternatively, the leads may be formed by individually extending the respective positive electrode current collectors and the respective negative electrode current collectors, which are to be described later. Although not shown, preferably, the positive electrode lead and the negative electrode lead on portions of being taken out from the outer jacket are coated with heat-resistant and insulating thermal shrinkage tubes and the like so as not to affect products (for example, automotive components, and in particular, electronic components and the like) by causing a current leakage and so on by contacting peripheral instruments, wires and the like.

Moreover, though not shown, current collector plates may be used for the purpose of taking a current to an outside of the battery. The current collector plates are electrically connected to the current collectors and the leads, and are taken out to an outside of the laminated film as an outer package material of the battery. A material that composes the current collector plates is not particularly limited, and a highly conductive material, which is known in public and has heretofore been used as current collector plates for the lithium ion secondary battery, can be used. As such a constituent material of the current collector plates, for example, a metal material such as aluminum (Al), copper (Cu), titanium (Ti), nickel (Ni), alloys thereof, and stainless steel (SUS) is preferable, and from viewpoints of light weight, corrosion resistance and high conductivity, aluminum (Al), copper (Cu) or the like is more preferable. Note that, for the positive electrode current collector plate and the negative electrode current collector plate, the same material may be used, or different materials may be used.

<Outer Jacket>

Preferably, the outer jacket 30 is formed, for example, of a film-like outer package material from viewpoints of miniaturization and weight reduction. However, the outer jacket is not limited to this, and a material, which has been heretofore known in public and is used for the outer jacket for the lithium ion secondary battery, can be used. That is to say, a metal can case can also be applied.

Note that, from a viewpoint of being excellent in output enhancement and cooling performance, and of being suitably usable for a battery for a large instrument such as an electric vehicle and a hybrid electric vehicle, a polymer-metal composite laminated film excellent in thermal conductivity can be mentioned as the outer jacket. More specifically, an outer jacket can be suitably used, which is formed of a laminated film with a three-layer structure composed by stacking polypropylene as a thermocompression layer, aluminum as a metal layer and Nylon as an outer protection layer on one another in this order.

Note that, in place of the above-mentioned laminated film, the outer jacket may be composed of another structure, for example, a laminated film that does not have a metal material, a polymer film such as polypropylene, a metal film or the like.

Here, a general configuration of the outer jacket can be represented by a stacked structure of the outer protection layer/the metal layer/the thermocompression layer. However, in some case, the outer protection layer is composed of plural layers, and the thermocompression layer is composed of plural layers. Note that it is sufficient if the metal layer functions as an impermeable barrier film, and not only aluminum foil but also stainless steel foil, nickel foil, plated iron foil and the like can be used. However, as the metal layer, the aluminum foil, which is thin, lightweight and excellent in workability, can be suitably used.

Configurations usable as the outer jacket are listed below in the format of (outer protection layer/metal layer/thermocompression layer): Nylon/aluminum/unstretched polypropylene; polyethylene terephthalate/aluminum/unstretched polypropylene; polyethylene terephthalate/aluminum/polyethylene terephthalate-unstretched polypropylene; polyethylene terephthalate-Nylon/aluminum/unstretched polypropylene; polyethylene terephthalate-Nylon/aluminum/Nylon-unstretched polypropylene; polyethylene terephthalate-Nylon/aluminum/Nylon-polyethylene; Nylon-polyethylene/aluminum/linear low-density polyethylene; polyethylene terephthalate-polyethylene/aluminum/polyethylene terephthalate-low-density polyethylene; polyethylene terephthalate-Nylon/aluminum/low-density polyethylene-unstretched polypropylene; and the like.

<Battery Element>

As shown in FIG. 2, the battery element 10 has a configuration in which positive electrodes 11, electrolyte layers 13 and negative electrodes 12 are stacked on one another. Here, in each of the positive electrodes 11, positive electrode active material layers 11B are formed on both of main surfaces of a positive electrode current collector 11A, and in each of the negative electrodes 12, negative electrode active material layers 12B are formed on both of main surfaces of a negative electrode current collector 12A. At this time, the positive electrode active material layer 11B, which is formed on one of the main surfaces of the positive electrode current collector 11A in one positive electrode 11, and the negative electrode active material layer 12B, which is formed on one of the main surfaces of the negative electrode current collector 12A in the negative electrode 12 adjacent to the one positive electrode 11, face each other while interposing the electrolyte layer 13 there between. In such a way, pluralities of the positive electrodes, the electrolyte layers and the negative electrodes are stacked on one another in this order.

In such a way, the positive electrode active material layer 11B, the electrolyte layer 13 and the negative electrode active material layer 12B, which are adjacent to one another, compose one single cell layer 14. Hence, the lithium ion secondary battery 1 of this embodiment becomes one, in which a plurality of the single cell layers 14 are stacked on one another, and are thereby electrically connected in parallel to one another. Note that each of the positive electrodes and the negative electrodes may be one, in which each of the active material layers is formed on one of the main surfaces of each current collector. In this embodiment, for example, on a negative electrode current collector 12A located on an outermost layer of the battery element 10, the negative electrode active material layer 12B is formed on only one surface thereof.

Though not shown, on outer circumferences of the single cell layers, there may be provided insulating layers for insulating the positive electrode current collectors and the negative electrode current collectors, which are adjacent to each other, from each other. Preferably, the insulating layers as described above are formed of a material, which holds an electrolyte contained in the electrolyte layers and the like, and prevents liquid leakage of the electrolyte to the outer circumferences of the single cell layers. Specifically, usable are: general-purpose plastics such as polypropylene (PP), polyethylene (PE), polyurethane (PUR), polyamide-based resin (PA), polytetrafluoroethylene (PTFE), polyvinylidene fluoride (PVDF) and polystyrene (PS); thermoplastic olefin rubber; and the like. Moreover, silicon rubber can also be used.

<Positive electrode current collector and negative electrode current collector> The positive electrode current collectors 11A and the negative electrode current collectors 12A are composed of a conductive material. A size of the current collectors can be determined in response to a usage purpose of the battery. For example, if the current collectors are used for a large battery for which a high energy density is required, then the current collectors with a large area are used. A thickness of the current collectors is not particularly limited, either. In usual, the thickness of the current collectors approximately ranges from 1 to 100 µm. A shape of the current collectors is not particularly limited, either. In the battery element 10 shown in FIG. 2, besides current collector foil, those with a mesh pattern (expand grid and the like) and the like can be used. Note that, in the case where a thin film alloy as an example of the negative electrode active material is directly formed on the negative electrode current collectors 12A by the sputtering method and the like, it is desirable to use the current collector foil.

Such a material that composes the current collectors is not particularly limited. For example, metal can be employed, and resin can be employed, in which conductive filler is added to a conductive polymer material or a non-conductive polymer material. Specifically, as metal, there are mentioned aluminum (Al), nickel (Ni), iron (Fe), stainless steel (SUS), titanium (Ti), copper (Cu) and the like. Besides these, it is preferable to use a clad material of nickel and aluminum, a clad material of copper and aluminum, a plated material in which these metals are combined with one another, and the like. Moreover, the metal may be foil in which aluminum is coated on a surface of metal. Among them, aluminum, stainless steel, copper and nickel are preferable from viewpoints of the electron conductivity, a battery operation potential and the like.

Moreover, as the conductive polymer material, for example, there are mentioned polyaniline, polypyrrole, polythiophene, polyacetylene, polyparaphenylene, polyphenylene vinylene, polyacrylonitrile, polyoxadiazole and the like. Such conductive polymer materials have sufficient conductivity even if the conductive filler is not added thereto, and accordingly, are advantageous in a point of facilitation of the manufacturing process or of weight reduction of the current collectors.

As the non-conductive polymer material, for example, there are mentioned polyethylene (PE: high-density polyethylene (HDPE), low-density polyethylene (LDPE) and the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF), polystyrene (PS), and the like. Such non-conductive polymer materials have excellent potential resistance or solvent resistance.

According to needs, the conductive filler can be added to the conductive polymer material or the non-conductive polymer material, which is described above. In particular, in the case where resin that serves as a base material of the current collectors is composed of only the non-conductive polymer, the conductive filler becomes necessarily essential in order to impart the conductivity to the resin. As long as being a material having the conductivity, the conductive filler can be used without receiving limitations in particular. For example, as a material excellent in conductivity, potential resistance or lithium ion barrier properties, there are mentioned metal, conductive carbon and the like.

As the metal to be used as the conductive filler, there can be mentioned at least one metal selected from the group consisting of nickel (Ni), titanium (Ti), aluminum (Al), copper (Cu), platinum (Pt), iron (Fe), chromium (Cr), tin (Sn), zinc (Zn), indium (In), antimony (Sb) and potassium (K). Moreover, alloys or metal oxides, which contain these metals, can also be mentioned as suitable examples.

Moreover, as a suitable example of the conductive carbon, there can be mentioned at least one selected from the group consisting of acetylene black, Vulcan, Black Pearl, carbon nanofiber, Ketjen Black, carbon nanotube, carbon nanohorn, carbon nano-balloon and fullerene. A loading amount of the conductive filler is not particularly limited as long as being an amount by which sufficient conductivity can be imparted to the current collectors, and in general, approximately ranges from 5 to 35 mass %. However, the current collectors are not limited to these, and materials, which have been heretofore known in public and are used as the current collectors for the lithium ion secondary battery, can be used.

<Positive Electrode Active Material Layer>

The positive electrode active material layer 11B contains, as the positive electrode active material, at least one of the transition metal oxides, each containing solid solution lithium, according to the first embodiment of the present invention and second to fourth embodiments of the present invention, which are to be described later. Then, the positive electrode active material layer 11B may contain a binder or a conductive assistant according to needs.

The binder is not particularly limited; however, the following materials are mentioned. For example, there are mentioned thermoplastic polymers such as: polyethylene (PE), polypropylene (PP), polyethylene terephthalate (PET), polyether nitrile (PEN), polyacrylonitrile (PAN), polyimide (PI), polyamide (PA), cellulose, carboxymethyl cellulose (CMC), an ethylene-vinyl acetate copolymer, polyvinyl chloride (PVC), styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof. Moreover, there are mentioned fluorine resins such as polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF). Furthermore, there are mentioned: vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene-based fluorine rubber (VDF-CTFE-based fluorine rubber); epoxy resin; and the like. Among them, more preferably, the binder is polyvinylidene fluoride, polyimide, styrene-butadiene rubber, carboxymethyl cellulose, polypropylene, polytetrafluoroethylene, polyacrylonitrile, and polyamide. These suitable binders are excellent in heat resistance, further have extremely wide potential windows, are stable at both of the positive electrode potential and the negative electrode potential, and are usable for the positive electrode active material layer and the negative electrode active material layer. However, the binder is not limited to these, and materials, which are known in public and have been heretofore used as the binder for the lithium ion secondary battery, can be used. These binders may be each used singly, or two or more thereof may be used in combination.

An amount of the binder contained in the positive electrode active material layer is not particularly limited as long as the binder can bind the positive electrode active material. However, the amount of binder is preferably 0.5 to 15 mass %, more preferably 1 to 10 mass % with respect to the positive electrode active material layer.

The conductive assistant is one to be blended in order to enhance the conductivity of the positive electrode active material layer. As the conductive assistant, for example, there can be mentioned carbon materials such as: carbon black including acetylene black; graphite; and vapor deposited carbon fiber. When the positive electrode active material layer contains the conductive assistant, an electron network in the inside of the positive electrode active material layer is formed effectively, and such containing of the conductive assistant can contribute to the enhancement of the output characteristics of the battery. However, the conductive assistant is not limited to these, and materials, which have been heretofore known in public and are used as the conductive assistants for the lithium ion secondary battery, can be used. These conductive assistants may be each used singly, or two or more thereof may be used in combination.

Moreover, a conductive binder, which has functions of the above-described conductive assistant and binder in combination, may be used in place of these conductive assistant and binder, or may be used in combination with one or both of these conductive assistant and binder. As the conductive binder, for example, commercially available TAB-2 made by Hohsen Corporation can be used.

Furthermore, it is suitable that a density of the positive electrode active material layer be 2.5 g/cm$^3$ or more to 3.0 g/cm$^3$ or less. In the case where the density of the positive electrode active material layer is 2.5 g/cm$^3$ or more, weight (filler content) thereof per unit volume is increased, whereby it is made possible to enhance the discharge capacity. Moreover, in the case where the density of the positive electrode active material layer is 3.0 g/cm$^3$ or less, reduction of a void amount of the positive electrode active material layer is prevented, whereby permeability of a non-aqueous electrolytic solution and diffusivity of lithium ions can be enhanced.

<Negative Electrode Active Material Layer>

The negative electrode active material layer 12B contains, as the negative electrode active material, a negative electrode material capable of occluding and discharging lithium, and may contain a binder and a conductive assistant according to needs. Note that, as the binder and the conductive assistant, those mentioned above can be used.

As the negative electrode material capable of occluding and discharging lithium, for example, there can be mentioned carbon materials such as graphite (natural graphite, artificial graphite and the like) as high crystalline carbon, low crystalline carbon (soft carbon, hard carbon), carbon black (Ketjen black, acetylene black, channel black, lamp black, oil furnace black, thermal black and the like), fullerene, carbon nanotube, carbon nanofiber, carbon nano-horn, and carbon fibril. Note that the carbon materials include one containing 10 mass % or less silicon nanoparticles. Moreover, there can be mentioned: simplexes of elements which make alloys with lithium, the elements including silicon (Si), germanium (Ge), tin (Sn), lead (Pb), aluminum (Al), indium (In), zinc (Zn), hydrogen (H), calcium (Ca), strontium (Sr), barium (Ba), ruthenium (Ru), rhodium (Rh), iridium (Ir), palladium (Pd), platinum (Pt), silver (Ag), gold (Au), cadmium (Cd), mercury (Hg), gallium (Ga), thallium (Tl), carbon (C), nitrogen (N), antimony (Sb), bismuth (Bi), oxygen (O), sulfur (S), selenium (Se), tellurium (Te), chlorine (Cl) and the like; and oxides (silicon monoxide (SiO), $SiO_x$ (0<x<2), tin dioxide ($SnO_2$), SnO (0<x<2), $SnSiO_3$ and the like), carbides (silicon carbide (SiC) and the like) and the like, which contain these elements. Furthermore, metal materials such as lithium metal and lithium-transition metal composite oxides such as lithium-titanium composite oxides (lithium titanate: $Li_4Ti_5O_{12}$) can be mentioned. However, the negative electrode active material is not limited to these, and materials, which have been heretofore known in public and are used as the negative electrode active material for the lithium ion secondary battery, can be used. These negative electrode active materials may be each used singly, or two or more thereof may be used in combination.

Moreover, in this embodiment, suitably, the carbon material is made of a black lead material, which is coated with an amorphous carbon layer, and does not have a scale shape. Moreover, suitably, a BET specific surface area of the carbon material is 0.8 $m^2$/g or more to 1.5 $m^2$/g or less, and a tap density thereof is 0.9 g/$cm^3$ or more to 1.2 g/$cm^3$ or less. The carbon material made of the black lead material, which is coated with an amorphous carbon layer, and does not have a scale shape, is preferable since lithium ion diffusivity to a black lead layered structure is high. Moreover, if the BET specific surface area of the carbon material as described above is 0.8 $m^2$/g or more to 1.5 $m^2$/g or less, then such a capacity retention ratio can be further enhanced. Furthermore, if the tap density of the carbon material as described above is 0.9 g/$cm^3$ or more to 1.2 g/$cm^3$ or less, then weight (filler content) thereof per unit volume can be enhanced, and the discharge capacity can be enhanced.

Furthermore, in this embodiment, suitably, a BET specific surface area of the negative electrode active material layer, which contains at least the carbon material and the binder, is 2.0 $m^2$/g or more to 3.0 $m^2$/g or less. By the fact that the BET specific surface area of the negative electrode active material layer is 2.0 $m^2$/g or more to 3.0 $m^2$/g or less, the permeability of the non-aqueous electrolytic solution can be enhanced, the capacity retention ratio can be further enhanced, and generation of gas owing to decomposition of the non-aqueous electrolytic solution can be suppressed.

Moreover, in this embodiment, suitably, a BET specific surface area of the negative electrode active material layer, which contains at least the carbon material and the binder, the BET specific surface area being obtained after the negative electrode active material layer is press-molded, is 2.01 $m^2$/g or more to 3.5 $m^2$/g or less. The BET specific surface area of the negative electrode active material layer thus already press-molded is set at 2.01 $m^2$/g or more to 3.5 $m^2$/g or less, whereby the permeability of the non-aqueous electrolytic solution can be enhanced, the capacity retention ratio can be further enhanced, and the generation of gas owing to the decomposition of the non-aqueous electrolytic solution can be suppressed.

Furthermore, in this embodiment, suitably, an increment of the BET specific surface area before and after the negative electrode active material layer, which contains at least the carbon material and the binder, is press-molded, is 0.01 $m^2$/g or more to 0.5 $m^2$/g or less. In such a way, the BET specific surface area after the negative electrode active material layer is press-molded can be set at 2.01 $m^2$/g or more to 3.5 $m^2$/g or less, whereby the permeability of the non-aqueous electrolytic solution can be enhanced, the capacity retention ratio can be further enhanced, and the generation of gas owing to the decomposition of the non-aqueous electrolytic solution can be suppressed.

Moreover, a thickness of each of the active material layers (each active material layer on one of the surfaces of each current collector) is not particularly limited, either, and knowledge heretofore known in public about the battery can be referred to as appropriate. An example of the thickness is mentioned. In usual, the thickness of each active material layer approximately ranges from 1 to 500 μm, preferably 2 to 100 μm in consideration of the usage purpose of the battery (output is regarded important, energy is regarded important, and so on), and of ion conductivity.

Moreover, in the case where optimum particle diameters are different among the respective active materials in the event of developing the effects individually intrinsic to the active materials, the active materials just need to be mixed and used while setting the optimum particle diameters in the event of developing the effects individually intrinsic thereto. Accordingly, it is not necessary to uniform the particle diameters of all of the active materials. For example, in the case of using one with a particle form as the positive electrode active material made of the transition metal oxide containing solid solution lithium, a mean particle diameter thereof just needs to be substantially the same as a mean particle diameter of the positive electrode active material contained in the existing positive electrode active material layer, and is not particularly limited. The mean particle diameter just needs to preferably range from 1 to 20 μm from the viewpoint of the output enhancement. Note that the "particle diameter" stands for a maximum distance among distances, each of which is between arbitrary two points on outlines of the active material particles (observed surfaces) observed by using observing means such as a scanning electron microscope (SEM) and a transmission electron microscope (TEM). As a value of the "mean particle diameter", a value is employed, which is calculated as a mean value of particle diameters of particles observed in several to several ten visual fields by using the observing means such as the scanning electron microscope and the transmission electron microscope. Particle diameters and mean particle diameters of the other constituent components can also be defined in a similar way.

However, the mean particle diameters are never limited to the range as described above, and may go out of this range as long as the functions and effects of this embodiment can be developed effectively.

<Electrolyte Layer>

As the electrolyte layer 13, for example, there can be mentioned: one in which a layer structure is formed by using an electrolytic solution held in a separator to be described later, and by using a polymer gel electrolyte and a solid polymer electrolyte; and further, one in which a stacked structure is formed by using a polymer gel electrolyte and a solid polymer electrolyte.

Preferably, the electrolytic solution is one, which is usually used in the lithium ion secondary battery. Specifically, the electrolytic solution has a form in which a supporting electrolyte (lithium salt) is dissolved into an organic solvent. As the lithium salt, for example, there can be mentioned at least one lithium salt selected from inorganic acid anion salts such as lithium phosphate hexafluoride ($LiPF_6$), lithium borate tetrafluoride ($LiBF_4$), lithium perchlorate ($LiClO_4$), lithium arsenate hexafluoride ($LiAsF_6$), lithium tantalate hexafluoride ($LiTaF_6$), lithium aluminate tetrachloride ($LiAlCl_4$) and lithium decachlorodecaborate ($Li_2B_{10}Cl_{10}$), and the like. Moreover, there can be mentioned at least one lithium salt selected from organic acid anion salts such as lithium trifluoromethane sulfonate ($LiCF_3SO_3$), lithium bis(trifluoromethanesulfonyl)imide ($Li(CF_3SO_2)_2N$) and lithium bis(pentafluoroethanesulfonyl)imide ($Li(C_2F_5SO_2)_2N$), and the like. Among them, lithium phosphate hexafluoride ($LiPF_6$) is preferable. Moreover, as the organic solvent, for example, there can be used at least one selected from: cyclic carbonates such as propylene carbonate (PC) and ethylene carbonate (EC); chain carbonates such as dimethyl carbonate (DMC), methyl ethyl carbonate (EMC) and diethyl carbonate (DEC); ethers such as tetrahydrofuran, 2-methyltetrahydrofuran, 1,4-dioxane, 1,2-dimethoxyethane and 1,2-dibutoxyethane; lactones such as γ-butyrolactone; nitriles such as acetonitrile; esters such as methyl propionate; amides such as dimethylformamide; methyl acetate; and methyl formate. Note that, as the separator, for example, there can be mentioned a microporous membrane, a porous flat plate, and further, nonwoven fabric, which are made of polyolefin such as polyethylene (PE) and polypropylene (PP).

The polymer gel electrolyte is one in which the above-described electrolytic solution usually used in the lithium ion secondary battery is contained in the solid polymer electrolyte having the ion conductivity. However, the polymer gel electrolyte is not limited to this, and also includes one in which a similar electrolytic solution is held in a polymer skeleton that does not have the lithium ion conductivity. As a polymer, which is used for the polymer gel electrolyte and does not have the lithium ion conductivity, for example, polyvinylidene fluoride (PVdF), polyvinyl chloride (PVC), polyacrylonitrile (PAN), polymethyl methacrylate (PMMA) and the like are usable. However, the polymer is not limited to these. Note that polyacrylonitrile (PAN), polymethyl methacrylate (PMMA) and the like belong, if anything, to a category of materials in which the ion conductivity is hardly present, and accordingly, can also be said to be polymers having the above-described ion conductivity. However, here, polyacrylonitrile and polymethyl methacrylate are illustrated as such polymers which do not have the lithium ion conductivity.

As the solid polymer electrolyte, for example, those can be mentioned, which have a configuration formed by dissolving the above-described lithium salts into polyethylene oxide (PEO), polypropylene oxide (PPO) and the like, and do not contain the organic solvent. Hence, in the case where the electrolyte layer is composed of the solid polymer electrolyte, there is no concern about the liquid leakage from the battery, and reliability of the battery can be enhanced.

Preferably, a thickness of the electrolyte layer is thin from a viewpoint of reducing internal resistance. The thickness of the electrolyte layer is usually 1 to 100 μm, preferably 5 to 50 μm.

Note that a matrix polymer of the polymer gel electrolyte or the solid polymer electrolyte can develop excellent mechanical strength by forming a crosslinked structure. In order to form the crosslinked structure, a polymerizable polymer for forming the polymer electrolyte just needs to be subjected to polymerization treatment such as thermal polymerization, ultraviolet polymerization, radiation polymerization and electron beam polymerization by using an appropriate polymerization initiator. Note that, as the polymerizable polymer, for example, polyethylene oxide and polypropylene oxide can be mentioned.

<Manufacturing Method of Lithium Ion Secondary Battery>

Next, a description is made of an example of a manufacturing method of the lithium ion secondary battery according to this embodiment mentioned above.

First, the positive electrode is fabricated. For example, in the case of using a granular positive electrode active material, the above-mentioned transition metal oxide containing solid solution lithium is mixed with the conductive assistant, the binder and a viscosity adjusting solvent according to needs, whereby positive electrode slurry is prepared. Subsequently, this positive electrode slurry is coated on the positive electrode current collector, and is dried and press-molded, whereby the positive electrode active material layer is formed.

Moreover, the negative electrode is fabricated. For example, in the case of using a granular negative electrode active material, the negative electrode active material is mixed with the conductive assistant, the binder and the viscosity adjusting solvent according to needs, whereby negative electrode slurry is prepared. Thereafter, this negative electrode slurry is coated on the negative electrode current collector, and is dried and press-molded, whereby the negative electrode active material layer is formed.

Subsequently, the positive electrode lead is attached to a plurality of the positive electrodes, in addition, the negative electrode lead is attached to a plurality of the negative electrodes, and thereafter, the positive electrodes, the separators and the negative electrodes are stacked on one another. Moreover, one in which these are stacked on one another is sandwiched by polymer-metal composite laminated sheets, and outer circumferential edge portions of the polymer-metal composite laminated sheets, each of which excludes one side, are heat-sealed, whereby a bag-like outer jacket is formed. Thereafter, the above-described electrolytic solution is prepared, is injected from an opening portion of the outer jacket to an inside thereof, and is sealed by heat-sealing the opening portion of the outer jacket. In such a way, the laminate-type lithium ion secondary battery is completed.

Furthermore, a description is made of another example of the manufacturing method of the lithium ion secondary battery. First, in a similar way to the above, the positive electrode and the negative electrode are fabricated. Subsequently, the positive electrode lead is attached to the plurality of positive electrodes, in addition, the negative electrode lead is attached to the plurality of negative electrodes, and thereafter, the positive electrodes, the separators and the negative electrodes are stacked on one another. Moreover, one in which these are stacked on one another is sandwiched by polymer-metal composite laminated sheets, and outer circumferential edge portions of the polymer-metal composite laminated sheets, each of which excludes one side, are heat-sealed, whereby a bag-like outer jacket is formed.

Thereafter, the above-described electrolytic solution is prepared, is injected from an opening portion of the outer jacket to an inside thereof, and is sealed by heat-sealing the opening portion of the outer jacket. Furthermore, a resultant thus obtained is subjected to the above-mentioned electrochemical pretreatment. In such a way, the laminate-type lithium ion secondary battery is completed.

Example 1

A description is made below in more detail of this embodiment by examples and comparative examples; however, the present invention is not limited to these examples. In this example, operations described below were performed, whereby laminate-type lithium ion secondary batteries as shown in FIG. 2 were fabricated, and performance thereof was evaluated.

Example 1-1

Synthesis of Positive Electrode Active Material 1

As each of the positive electrode active materials 1, the transition metal oxide containing lithium with a following chemical formula was synthesized by using the composite carbonate method. As starting materials, sulfates of nickel, cobalt and manganese were used, whereby an aqueous nickel sulfate solution, an aqueous cobalt sulfate solution and an aqueous manganese sulfate solution, in each of which a concentration was 2 mol/L, were prepared. As a precipitant, an aqueous sodium carbonate solution with a concentration of 2 mol/L was used, and as a pH control chemical, an aqueous ammonia solution with a concentration of 0.2 mol/L was used.

First, the aqueous nickel sulfate solution, the aqueous cobalt sulfate solution and the aqueous manganese sulfate solution were mixed with one another so that nickel, cobalt and manganese could achieve a ratio of a chemical formula shown below, whereby an aqueous composite sulfate solution was prepared. Then, an aqueous sodium carbonate solution was dropped into the aqueous composite sulfate solution stirred by a magnetic stirrer, whereby a precursor was precipitated. Thereafter, the precursor was aspirated and filtrated, and a precipitate deposited on filter paper was dried, whereby a precursor of composite hydroxide was obtained.

Thereafter, the obtained precursor of the composite hydroxide and lithium carbonate were mixed with each other so that the composite hydroxide and the lithium carbonate could achieve the ratio of the chemical formula shown below. Then, a resultant mixture was temporarily calcined at 500° C., and was mainly calcined at 800° C. for 12 hours in an inert gas atmosphere, whereby a target sample was obtained.

Chemical formula: $Li_{1.5}[Ni_{0.3}Co_{0.3}Mn_{0.7}[Li]_{0.2}]O_3$ (a+b+c+d=1.5, d=0.2, a+b+c=1.3)

<Composition of Positive Electrode Slurry>

Positive electrode active material 1: $Li_{1.5}[Ni_{0.3}Co_{0.3}Mn_{0.7}[Li]_{0.2}]O_3$ (90 parts by weight)

Conductive assistant: scale-like black lead (1 part by weight), acetylene black (4 parts by weight)

Binder: polyvinylidene fluoride (PVDF) (5 parts by weight)

Solvent: N-methyl-2-pyrrolidone (NMP)

<Production/Coating/Drying of Positive Electrode Slurry>

90 parts by weight of the positive electrode active material, 1 part by weight of the scale-like black lead and 4 parts by weight of the acetylene black, which serve as the conductive assistants, and 5 parts by weight of the polyvinylidene fluoride were mixed with one another. Moreover, the N-methyl-2-pyrrolidone (NMP) was added to and mixed with this mixture, whereby positive electrode slurry was formed.

Next, on aluminum foil as the current collector, the obtained positive electrode slurry was coated so that an amount of the active material could be 6 mg per unit area of 100 mm$^2$, and was vacuum-dried at 100° C. Then, this resultant was pressed by using a roll press so that a density of the positive electrode active material layer could be 2.75 g/cm$^3$. Moreover, the resultant was punched into a circular shape, and a positive electrode with a diameter of 15 mm was obtained.

<Fabrication of Lithium Ion Secondary Battery>

The positive electrode and a negative electrode made of metal lithium were allowed to face each other, and two separators were arranged there between. Subsequently, such a stacked body of the negative electrode, the separators and the positive electrode was arranged on a bottom portion side of a coin cell. Moreover, a gasket for keeping insulating properties between the positive electrode and the negative electrode was mounted, and an electrolytic solution to be described below was injected by using a syringe. Thereafter, a spring and a spacer were stacked, and an upper side of the coin cell was superimposed and crimped, whereby hermetic sealing was made. In such a way, the lithium ion secondary battery of this example was fabricated. Note that, with regard to the used separator, a material thereof is polypropylene, and a thickness thereof is 20 μm. With regard to the coin cell, a standard thereof is CR2032, and a material thereof is stainless steel (SUS316). As the electrolytic solution, one was used, in which lithium phosphate hexafluoride (LiPF$_6$) as the supporting electrolyte was dissolved into an organic solvent so that a concentration thereof could be 1 mol/L. Moreover, as the organic solvent, one was used, in which ethylene carbonate (EC) and diethyl carbonate (DEC) were mixed with each other in a ratio of EC:DEC=1:2 (volume ratio).

<Electrochemical Pretreatment>

First, charge/discharge for the above-described lithium ion secondary battery was performed. The charge was performed by the constant current and constant voltage charge (CCCV) method, in which the charge was performed at a rate of 0.1 C until the maximum voltage of the battery became 4.2V, and thereafter, the maximum voltage was held for approximately 24 hours. Moreover, the discharge was performed by the constant current discharge (CC) method, in which the discharge was performed at a rate of 1.0 C until the minimum voltage of the battery became 2.5V.

Next, as shown in Table 2, a constant current charge/discharge cycle, in which the charge was performed at a rate of 0.1 C until the maximum voltage became 4.5V, and thereafter, the discharge was performed at a rate of 1.0 C until the minimum voltage became 2.0V, was carried out twice (Pattern 1). Next, a constant current charge/discharge cycle, in which the charge was performed at a rate of 0.1 C until the maximum voltage became 4.6V, and thereafter, the discharge was performed at a rate of 1.0 C until the minimum voltage became 2.0V, was carried out once (Pattern 2). Furthermore, a constant current charge/discharge cycle, in which the charge was performed at a rate of 0.1 C until the maximum voltage became 4.7V, and thereafter, the discharge was performed at a rate of 0.1 C until the minimum voltage became 2.0V, was carried out once (Pattern 3). All of the patterns were performed under room temperature (25° C.). As described above, the lithium ion secondary battery of this example was obtained.)

containing lithium in the plateau region, and from the chemical formula of each of the examples. Then, the spinel structure change ratio was obtained based on Equation 1 from the actual capacity of the plateau region, the theoretical capacity and the composition ratio. The theoretical capacities caused by $Li_2MnO_3$ in the plateau region, the composition ratios of $Li_2MnO_3$, the actual capacities of the plateau regions, and the spinel structure change ratios are shown in Table 1.

TABLE 2

| Pattern (—) | State (—) | Minimum voltage (V) | Maximum voltage (V) | Current rate (C) | Time (h) | Mode (—) | Repeat count (number of times) |
|---|---|---|---|---|---|---|---|
| 1 | charge | — | 4.5 | 0.1 | 15 | CC | 2 |
|   | discharge | 2.0 | — | 1.0 | 15 | CC |   |
| 2 | charge | — | 4.6 | 0.1 | 15 | CC | 1 |
|   | discharge | 2.0 | — | 1.0 | 15 | CC |   |
| 3 | charge | — | 4.7 | 0.1 | 15 | CC | 1 |
|   | discharge | 2.0 | — | 1.0 | 15 | CC |   |

TABLE 1

| | Positive electrode active material | Composition formula: $Li_{1.5}[Ni_3Co_bMn_c[Li]_d]O_3$ $0 < a < 1.4$, $0 \le b < 1.4$, $0 < c < 1.4$, $0.1 < d \le 0.4$, $a + b + c + d = 1.5$, $1.1 \le a + b + c < 1.4$ | | | | | | Theoretical capacity caused by $Li_2MnO_3$ in plateau region (mAh/g) | $Li_2MnO_3$ composition ratio (—) | Actual capacity of plateau region (mAh/g) | (K) | Discharge capacity in first cycle (mAh/g) | Capacity retention ratio (%) |
|---|---|---|---|---|---|---|---|---|---|---|---|---|---|
| | | a | b | c | d | a + b + c + d | a + b + c | | | | | | |
| Example 1-1 | 1 | 0.3 | 0.3 | 0.7 | 0.2 | 1.5 | 1.3 | 351.2 | 0.4 | 47.8 | 0.261 | 214.2 | 94.5 |
| Example 1-2 | 2 | 0.15 | 0.15 | 1.0 | 0.2 | 1.5 | 1.3 | 351.2 | 0.4 | 86.1 | 0.470 | 236.4 | 93.8 |
| Example 1-3 | 3 | 0.3 | 0.3 | 0.7 | 0.2 | 1.5 | 1.3 | 351.2 | 0.4 | 114.1 | 0.623 | 251.3 | 93.5 |
| Example 1-4 | 4 | 0.375 | 0 | 0.875 | 0.25 | 1.5 | 1.25 | 369 | 0.5 | 151.1 | 0.660 | 231.7 | 93.3 |
| Example 1-5 | 5 | 0.375 | 0 | 0.875 | 0.25 | 1.5 | 1.25 | 369 | 0.5 | 159.6 | 0.697 | 248.2 | 92.3 |
| Example 1-6 | 6 | 0.375 | 0 | 0.875 | 0.25 | 1.5 | 1.25 | 369 | 0.5 | 197.9 | 0.864 | 267.3 | 90.5 |
| Example 1-7 | 7 | 0.2 | 0.2 | 0.8 | 0.3 | 1.5 | 1.2 | 386.8 | 0.6 | 183.0 | 0.666 | 243.1 | 92.8 |
| Example 1-8 | 8 | 0.2 | 0.2 | 0.8 | 0.3 | 1.5 | 1.2 | 386.8 | 0.6 | 217.4 | 0.791 | 269.3 | 92.1 |
| Example 1-9 | 9 | 0.2 | 0.2 | 0.8 | 0.3 | 1.5 | 1.2 | 386.8 | 0.6 | 235.8 | 0.858 | 281.7 | 90.8 |
| Example 1-10 | 10 | 0.15 | 0.15 | 0.85 | 0.35 | 1.5 | 1.15 | 404.6 | 0.7 | 181.1 | 0.565 | 187.6 | 94.2 |
| Example 1-11 | 11 | 0.15 | 0.15 | 0.85 | 0.35 | 1.5 | 1.15 | 404.6 | 0.7 | 229.9 | 0.717 | 223.7 | 93.3 |
| Example 1-12 | 12 | 0.15 | 0.15 | 0.85 | 0.35 | 1.5 | 1.15 | 404.6 | 0.7 | 254.2 | 0.793 | 241.2 | 93.1 |
| Example 1-13 | 13 | 0.1 | 0.1 | 0.9 | 0.4 | 1.5 | 1.1 | 315.6 | 0.8 | 121.3 | 0.331 | 136.7 | 84.2 |
| Example 1-14 | 14 | 0.1 | 0.1 | 0.9 | 0.4 | 1.5 | 1.1 | 315.6 | 0.8 | 161.6 | 0.441 | 201.5 | 82.6 |
| Comparative example 1-1 | 15 | 0.4 | 0.4 | 0.6 | 0.1 | 1.5 | 1.4 | 314.3 | 0.2 | 19.7 | 0.215 | 195.0 | 92.3 |
| Comparative example 1-2 | 16 | 0.1 | 0.05 | 0.9 | 0.45 | 1.5 | 1.05 | 314.3 | 0.8 | 66.7 | 0.182 | 107.3 | 85.1 |

A part of specifications of the positive electrode active materials is shown in Table 1, above.

Example 1-2 to Example 1-14, Comparative Example 1-1 and Comparative Example 1-2

A positive electrode active material 2 to a positive electrode active material 16, which are shown in Table 1, were used. Except for the above, similar operations to those of Example 1-1 were repeated, whereby lithium ion secondary batteries of the respective examples were obtained.

[Performance Evaluation of Battery]

<Spinel Structure Change Ratio (K)>

For each of the examples and the comparative examples, the actual capacity in the region (plateau region) from 4.5 V to 4.8V was measured. Moreover, the composition ratio of $Li_2MnO_3$ was calculated from the theoretical capacity, which is caused by $Li_2MnO_3$ in the transition metal oxide <Capacity of Battery>

For the lithium ion secondary battery of each of the above-described examples, the following charge/discharge treatment was repeated 100 cycles at 55° C. A ratio of a discharge capacity in a 100-th cycle with respect to a discharge capacity in a first cycle (that is, the ratio is [discharge capacity in 100-th cycle]/[discharge capacity in first cycle]×100) was defined as the capacity retention ratio. In Table 1, the discharge capacity in the first cycle and the capacity retention ratio are also listed.

Figure 3:
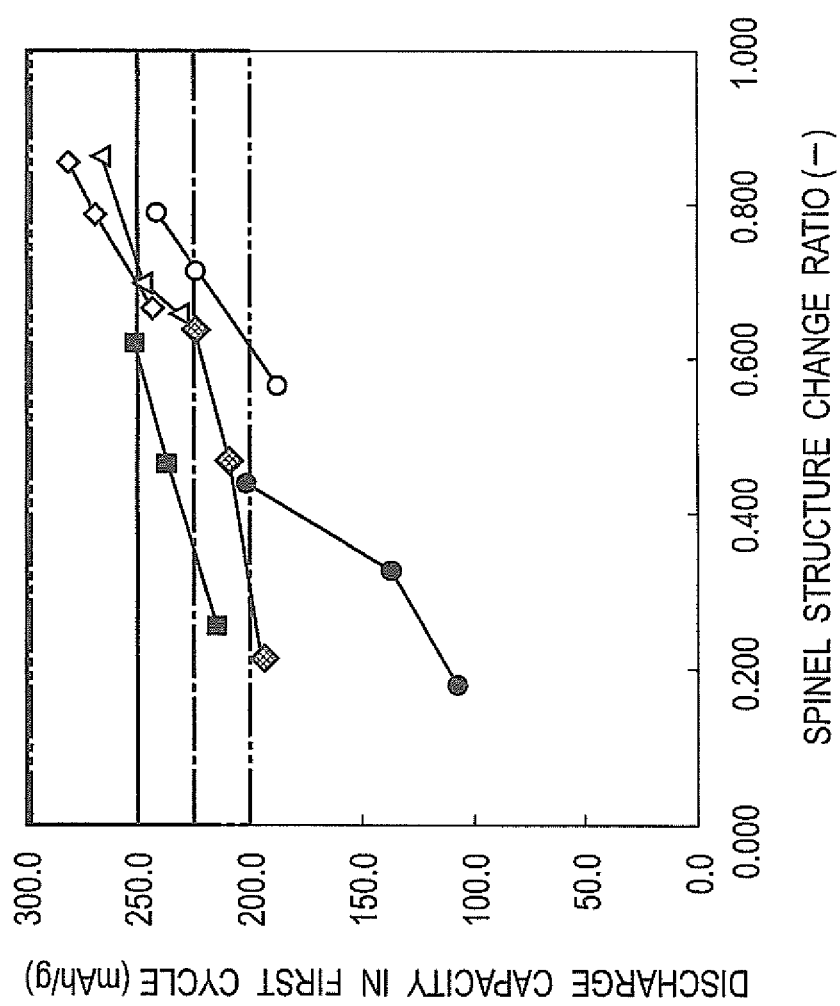
FIG. 3 is a graph showing relationships between a spinel structure change ratio and a discharge capacity in Example 1 of a first embodiment.
Figure 4:
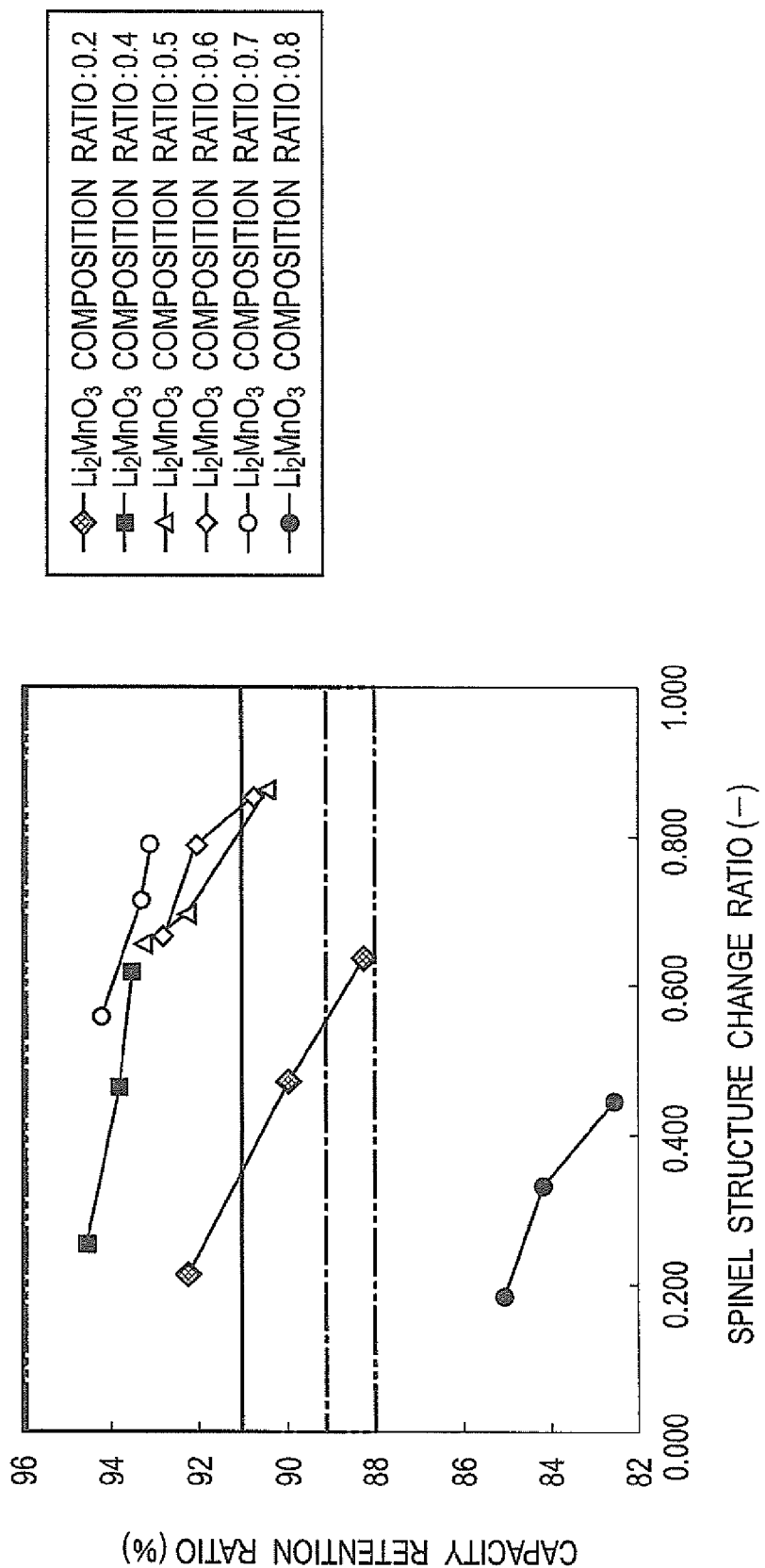
FIG. 4 is a graph showing relationships between the spinel structure change ratio and a capacity retention ratio in Example 1 of the first embodiment.

FIG. 3 is a graph showing relationships between the spinel structure change ratio and the discharge capacity in the first cycle. Moreover, FIG. 4 is a graph showing relationships between the spinel structure change ratio and the capacity retention ratio after 100 cycles. Note that, in FIG. 3 or FIG. 4, a range surrounded by a chain double-dashed line represents a preferable range from a viewpoint of the discharge capacity or the capacity retention ratio, and a range surrounded by an alternate long and short dashed line represents a more preferable range from the viewpoint of the discharge capacity or the capacity retention ratio. Furthermore, in FIG. 3 or FIG. 4, a range surrounded by a solid line represents a still more preferable range from the viewpoint of the discharge capacity or the capacity retention ratio.

<Charge/Discharge Treatment>

The charge was performed by a constant current and constant voltage charge method, in which the charge was performed at a rate of 1.0 C until the maximum voltage of the battery became 4.5V, and thereafter, the maximum voltage was held for approximately 1 to 1.5 hours. Moreover, the discharge was performed by a constant current discharge method, in which the discharge was performed at a rate of 1.0 C until the minimum voltage of the battery became 2.0V. Both of the charge and the discharge were performed under room temperature (25° C.).

From Table 1, FIG. 3 and FIG. 4, it is understood that Example 1-1 to Example 1-14, which belong to the scope of the present invention, have higher discharge capacities and capacity retention ratios in comparison with Comparative example 1-1 and Comparative example 1-2, which do not belong to the present invention.

Moreover, from FIG. 3, it is understood that the initial discharge capacity shows a tendency to be increased in a range where the composition ratio of $Li_2MnO_3$ in the transition metal oxide containing solid solution lithium is 0.2 to 0.6, and to be lowered in a range where the composition ratio is 0.7 to 0.8. Moreover, it is understood that the initial discharge capacity shows a tendency to be increased as the spinel structure change ratio is being increased. From this result, it is understood that the discharge capacity depends on both of the composition ratio of $Li_2MnO_3$ in the transition metal oxide containing solid solution lithium and of the spinel structure change ratio.

Furthermore, the capacity retention ratio after 100 cycles has a tendency to depend also on the discharge capacity to be taken out, and accordingly, from FIG. 4, with regard to the composition ratio of $Li_2MnO_3$ in the transition metal oxide containing solid solution lithium, such a tendency thereof cannot be unqualifiedly mentioned. However, it is understood that the capacity retention ratio after 100 cycles shows a constant tendency to the spinel structure change ratio, and shows a tendency to be lowered after the spinel change ratio is being increased.

From these results, it is understood that the discharge capacity and capacity retention ratio of the transition metal oxide containing solid solution lithium depends on the composition and spinel change ratio of the transition metal oxide containing solid solution lithium.

Note that, as a result of performing X-ray diffraction analysis for the transition metal oxide containing solid solution lithium, which is taken out by disassembling the lithium ion secondary battery of each of the examples, special peaks depending on the layered structure region and the spinel structure were observed. It was confirmed that, therefore, the transition metal oxide containing solid solution lithium according to each of the examples had the layered structure region and the spinel structure region.

Second Embodiment

Next, a description is made in detail of a transition metal oxide containing solid solution lithium, a non-aqueous electrolyte secondary battery positive electrode and a non-aqueous electrolyte secondary battery according to a second embodiment of the present invention.

First, a description is made in detail of the transition metal oxide containing solid solution lithium according to the second embodiment of the present invention. In a similar way to the first embodiment, the transition metal oxide containing solid solution lithium according to this embodiment contains the transition metal oxide containing lithium, which is represented by Chemical formula (1).

$$Li_{1.5}[Ni_aCo_bMn_c[Li]_d]O_3 \qquad (1)$$

In Formula (1), Li denotes lithium, Ni denotes nickel, Co denotes cobalt, Mn denotes manganese, and O denotes oxygen. Moreover, a, b, c and d satisfy relationships: $0<a<1.4$; $0\le b<1.4$; $0<c<1.4$; $0.1<d\le 0.4$; $a+b+c+d=1.5$; and $1.1\le a+b+c<1.4$.

Then, the transition metal oxide containing lithium according to this embodiment includes: a layered structure region; and a region ($Li_2MnO_3$ with a layered structure) changed to a spinel structure by being subjected to charge or charge/discharge in a predetermined potential range.

Moreover, such $Li_2MnO_3$ with the layered structure in the transition metal oxide containing lithium is changed to $LiMn_2O_4$ with a spinel structure. Then, when a ratio of the entire change from $Li_2MnO_3$ with the layered structure to $LiMn_2O_4$ with the spinel structure is defined to be 1, a spinel structure change ratio of the transition metal oxide containing lithium is 0.25 or more to less than 1.0.

Moreover, with regard to the transition metal oxide containing lithium according to this embodiment, a BET specific surface area thereof is 1 $m^2/g$ or more to 8.0 $m^2/g$ or less.

Still more, with regard to the transition metal oxide containing lithium according to this embodiment, a pore volume thereof measured by nitrogen is 0.025 $cm^3/g$ or less when a relative pressure is 0.98 to 0.99.

In a case of being used as the positive electrode active material of the lithium ion secondary battery, the transition metal oxide containing solid solution lithium, which is as described above, is capable of realizing high discharge capacity and capacity retention ratio, and accordingly, is suitably used as the lithium ion secondary battery positive electrode and the lithium ion secondary battery. As a result, the transition metal oxide containing solid solution lithium can be suitably used for a lithium ion secondary battery for a drive power supply or auxiliary power supply of a vehicle. Besides, the transition metal oxide containing solid solution lithium is sufficiently applicable also to a lithium ion secondary battery for home or a portable instrument.

In a similar way to the first embodiment, it is necessary that a, b, c and d satisfy relationships: $0<a<1.4$; $0\le b<1.4$; $0<c<1.4$; $0.1<d\le 0.4$; $a+b+c+d=1.5$; and $1.1\le a+b+c<1.4$ in Chemical formula (1). In a case where such mathematical formulas are not satisfied, then there is a possibility that the crystal structure of the transition metal oxide containing lithium may not be stabilized.

In a similar way to the first embodiment, the spinel structure change ratio does not become 1.0. Moreover, in a case where the spinel structure change ratio is less than 0.25, then what is obtained is only a transition metal oxide containing solid solution lithium, which is capable of realizing a discharge capacity and a capacity retention ratio, of which degrees are no larger than the conventional ones.

Moreover, in a similar way to the first embodiment, in Chemical formula (1), preferably, a, b, c, and d satisfy relationships: $0<a<1.35$; $0\le b<1.35$; $0<c<1.35$; $0.15<d\le 0.35$; $a+b+c+d=1.5$; and $1.15\le a+b+c<1.35$. Moreover, in the case where the charge or the charge/discharge in the predetermined potential range is performed, suitably, the spinel structure change ratio of the transition metal oxide containing lithium is 0.4 or more to less than 0.9. In a case of using the transition metal oxide containing solid solution lithium, which is as described above, for the positive electrode active material, then it becomes possible to obtain higher discharge capacity and capacity retention ratio.

Moreover, in a similar way to the first embodiment, in Chemical formula (1), more preferably, a, b, c, and d satisfy relationships: $0<a<1.3$; $0\le b<1.3$; $0<c<1.3$; $0.15<d\le 0.35$; $a+b+c+d=1.5$; and $1.2\le a+b+c<1.3$. Furthermore, in the case where the charge or the charge/discharge in the predetermined potential range is performed, more suitably, the spinel structure change ratio of the transition metal oxide containing lithium is 0.6 or more to 0.8 or less.

Preferably, with regard to the transition metal oxide containing lithium according to this embodiment, the BET specific surface area thereof is 1 $m^2/g$ or more to 8.0 $m^2/g$ or less. In a case where the BET specific surface area stays within this range, such lithium ion diffusivity in the transition metal oxide containing lithium is enhanced, and it becomes possible to enhance the discharge capacity in charge/discharge at a high rate. Note that the BET specific surface area can be measured based on Japanese Industrial Standard JIS Z8830.

Moreover, preferably, the pore volume of the transition metal oxide containing lithium, which is measured by nitrogen, is 0.025 $cm^3/g$ or less when the relative pressure is 0.98 to 0.99. In a case where the pore volume is 0.025 $cm^3/g$ or less, it becomes possible to obtain a transition metal oxide containing solid solution lithium, which is capable of realizing higher discharge capacity and capacity retention ratio than the conventional one. Note that the pore volume can be measured based on Japanese Industrial Standard JIS Z8831-2.

Note that, in a similar way to the first embodiment, preferably, treatment as below is performed in order to obtain a desired spinel structure change ratio. In the lithium ion secondary battery using the above-described transition metal oxide containing solid solution lithium for the positive electrode, charge or charge/discharge, in which a maximum potential of the positive electrode in the predetermined potential range is 4.3V or more to less than 4.8V in conversion to the lithium metal counter electrode, is performed. In such a way, the transition metal oxide containing solid solution lithium, in which the spinel structure change ratio is 0.25 or more to less than 1.0, can be obtained.

Suitably, with regard to the transition metal oxide containing lithium according to this embodiment, a 50%-penetration particle diameter (median diameter, D50) thereof is less than 15 μm. More suitably, the transition metal oxide containing lithium has particles with a particle diameter of less than 1 μm. By using the transition metal oxide containing lithium, which has such a particle diameter as described above, it becomes easy to control a porosity of the positive electrode active material layer, and the permeability of the non-aqueous electrolytic solution can be enhanced. Then, since the permeability of the non-aqueous electrolytic solution is enhanced, it becomes possible to reduce direct current resistance of the positive electrode active material layer. Note that the 50%-penetration particle diameter can be obtained by a particle size distribution measured by the dynamic light scattering.

Suitably, with regard to the transition metal oxide containing lithium according to this embodiment, a liquid absorption amount thereof for N-methyl-2-pyrrolidone is 0.5 $cm^3/g$ or less. In a case where the BET specific surface area of the transition metal oxide containing lithium is 1 $m^2/g$ or more to 8.0 $m^2/g$ or less, and the pore volume is 0.025 $cm^3/g$ or less, then the liquid absorption amount of N-methyl-2-pyrrolidone becomes likely to be 0.5 $cm^3/g$ or less. In this case, the permeability of the non-aqueous electrolytic solution and the lithium ion diffusivity in the transition metal oxide containing lithium are enhanced, and accordingly, it becomes possible to further enhance the discharge capacity and the capacity retention ratio.

Suitably, with regard to the transition metal oxide containing lithium, a true density thereof is 4.1 $g/cm^3$ or more to 4.6 $g/cm^3$ or less. In a case where the true density is 4.1 $g/cm^3$ or more, the weight (filler content) per unit volume of the transition metal oxide containing lithium is increased, and it becomes possible to enhance the discharge capacity. Moreover, in a case where the true density is 4.6 $g/cm^3$ or less, such a pore volume of the positive electrode active material layer is increased, and the permeability and lithium ion diffusivity of the non-aqueous electrolytic solution can be enhanced. Note that the true density can be obtained by a liquid phase substitution method (pycnometer method).

Next, a description is made in detail of a production method of the transition metal oxide containing solid solution lithium (transition metal oxide containing lithium) according to the second embodiment of the present invention.

First, as a precursor of the transition metal oxide containing lithium, a mixture with a crystallite size of 10 nm or more to 100 nm or less is prepared by mixing raw materials with one another, which contain a lithium compound, a nickel compound, a cobalt compound and a manganese compound such as sulfates and nitrates. Subsequently, the obtained mixture is calcined at 800 to 1000° C. for 6 to 24 hours under an inert gas atmosphere. In such a way, the transition metal oxide containing lithium can be prepared. Note that it is preferable to use nitrogen and argon as the inert gas.

Moreover, as another production method, first, as the precursor of the transition metal oxide containing lithium, a mixture with a crystallite size of 10 nm or more to 100 nm or less is prepared by mixing raw materials with one another, which contain a lithium compound, a nickel compound, a cobalt compound and a manganese compound such as sulfates and nitrates. Subsequently, the obtained mixture is calcined at 800 to 1000° C. for 6 to 24 hours, whereby a calcined product is obtained. Thereafter, the calcined product thus obtained is subjected to heat treatment at 600 to 800° C. under an inert gas atmosphere. In such a way, the transition metal oxide containing lithium can be prepared.

Note that, in order to obtain a desired spinel structure change ratio, preferably, treatment as described below is performed in a similar way to the first embodiment. In the lithium ion secondary battery using the above-described transition metal oxide containing solid solution lithium for the positive electrode, charge or charge/discharge, in which a maximum potential of the positive electrode in the predetermined potential range is 4.3V or more to less than 4.8V in conversion to the lithium metal counter electrode (electrochemical pretreatment), is performed. In such a way, the transition metal oxide containing solid solution lithium, in which the spinel structure change ratio is 0.25 or more to less than 1.0, can be obtained.

A description is made more in detail of the production method of the transition metal oxide containing solid solution lithium according to this embodiment.

In a similar way to the first embodiment, as such a production method of the precursor of the transition metal oxide containing lithium, a carbonate method (composite carbonate method) can be applied. Specifically, first, as starting materials, the respective sulfates, nitrates and the like of nickel, cobalt and manganese are prepared, and these are weighed by predetermined amounts, and thereafter, a mixed aqueous solution is prepared.

Subsequently, ammonia water is dropped into this mixed aqueous solution until pH thereof can be 7, and further, an aqueous solution of sodium carbonate ($Na_2CO_3$) is dropped thereinto, whereby composite carbonate of Ni—Co—Mn is precipitated. Then, the precipitated composite carbonate is aspirated and filtrated, is washed with water, and thereafter, is dried, and is temporarily calcined. Drying conditions and temporarily calcining conditions are similar to those of the first embodiment.

Moreover, to powder thus temporarily calcined, a little superfluous lithium hydroxide ($LiOH.H_2O$) is added and mixed. In this event, preferably, a crystallite size of this mixture is 10 nm or more to 100 nm or less. Then, this mixture is mainly calcined, whereby the precursor of the transition metal oxide containing lithium can be prepared. Main calcination conditions are also similar to those of the first embodiment.

Then, in a similar way to the first embodiment, the transition metal oxide containing solid solution lithium according to this embodiment can be obtained by performing oxidation treatment for the above-described precursor.

Configurations of the lithium ion secondary battery positive electrode and the lithium ion secondary battery according to the second embodiment of the present invention are similar to those of the first embodiment except for using the above-mentioned transition metal oxide containing solid solution lithium, and accordingly, a description thereof is omitted.

Example 2

A description is made below in more detail of this embodiment by examples and comparative examples; however, the present invention is not limited to these examples. In this example, operations described below were performed, whereby laminate-type lithium ion secondary batteries as shown in FIG. 2 were fabricated, and performance thereof was evaluated.

Example 2-1

Synthesis of Positive Electrode Active Material 1

As each of the positive electrode active materials 1, a transition metal oxide containing lithium with a following chemical formula was synthesized by using the composite carbonate method. As starting materials, sulfates of nickel, cobalt and manganese were used, whereby an aqueous nickel sulfate solution, an aqueous cobalt sulfate solution and an aqueous manganese sulfate solution, in each of which a concentration was 2 mol/L, were prepared. As a precipitant, an aqueous sodium carbonate solution with a concentration of 2 mol/L was used, and as a pH control chemical, an aqueous ammonia solution with a concentration of 0.2 mol/L was used.

First, the aqueous nickel sulfate solution, the aqueous cobalt sulfate solution and the aqueous manganese sulfate solution were mixed with one another so that nickel, cobalt and manganese could achieve a ratio of the chemical formula shown below, whereby an aqueous composite sulfate solution was prepared. Then, an aqueous sodium carbonate solution was dropped into the aqueous composite sulfate solution stirred by a magnetic stirrer, whereby a precursor was precipitated. Thereafter, the precursor was aspirated and filtrated, and a precipitate deposited on filter paper was dried, whereby a precursor of composite hydroxide was obtained.

Thereafter, the obtained precursor of the composite hydroxide and lithium carbonate were mixed with each other so that the composite hydroxide and the lithium carbonate could achieve the ratio of the chemical formula shown below. Then, a resultant mixture was temporarily calcined at 500° C., and was mainly calcined at 800° C. for 12 hours in an inert gas atmosphere, whereby a target sample was obtained.

Chemical formula: $Li_{1.5}[Ni_{0.2}Co_{0.2}Mn_{0.8}[Li]_{0.3}]O_3$ (a+b+c+d=1.5, d=0.3, a+b+c=1.2)
Pore volume: 0.008 $cm^3$/g
BET specific surface area: 1.07 $m^2$/g
Mean particle diameter (D50): 6.6 μm
True density: 4.2 g/$cm^3$ <Composition of Positive Electrode Slurry>
Positive electrode active material: $Li_{1.5}[Ni_{0.2}Co_{0.2}Mn_{0.8}[Li]_{0.3}]O_3$ (100 parts by weight)
Conductive assistant: scale-like black lead (1.0 part by weight), acetylene black (3.0 parts by weight)
Binder: polyvinylidene fluoride (PVDF) (3.0 parts by weight)
Solvent: N-methyl-2-pyrrolidone (NMP) (65 parts by weight)

<Production of Positive Electrode Slurry>
Positive electrode slurry with the above-described composition was prepared as below. First, 3.0 parts by weight of the binder were dissolved into 30 parts by weight of the NMP, whereby a binder solution was prepared. Next, 33.0 parts by weight of the above-described binder solution were added to mixed powder of 4.0 parts by weight of the conductive assistant and 100 parts by weight of the positive electrode active material powder, and a resultant was mixed by a planetary mixer (PVM100, made by Asada Iron Works Co., Ltd.). Thereafter, 35 parts by weight of the NMP were added to a mixed product, whereby the positive electrode slurry was prepared. Note that a solid concentration of the positive electrode slurry was 62 mass %.

<Coating/Drying of Positive Electrode Slurry>
On one surface of a current collector composed of aluminum foil with a thickness of 20 μm, the above-described positive electrode slurry was coated by a die coater while running the current collector at a running speed of 1 m/minute. Subsequently, this current collector coated with the positive electrode slurry was dried in a hot air drying furnace, whereby an amount of NMP remaining in the electrode active material layer was set at 0.02 mass % or less. Note that a drying temperature was set at 100° C. to 110° C., and a drying time was set at three minutes. Moreover, in a similar way to the above, the positive electrode slurry was coated also on a back surface of the aluminum foil, followed by drying. In such a way, a sheet-like positive electrode, which has positive electrode active material layers on both surfaces thereof, was formed.

<Press of Positive Electrode>
The sheet-like positive electrode was compressed by applying roller pressing thereto, followed by cutting. In such a way, a positive electrode was fabricated, in which weight of the active material layer on one surface was approximately 10 mg/$cm^2$, a thickness thereof was approximately 40 μm, and a density thereof was 2.80 g/$cm^3$. Hereinafter, this positive electrode is also referred to as a "positive electrode C1". When the surface of the positive electrode C1 was observed, an occurrence of a crack was not seen.

<Heat Treatment of Positive Electrode C1>
Next, the positive electrode C1 fabricated in the above-described procedure was subjected to heat treatment in a vacuum drying furnace. Specifically, after the positive electrode C1 was placed in an inside of the drying furnace, a pressure of the inside was reduced at room temperature (25° C.), and air in the drying furnace was removed until the pressure reached 100 mmHg ($1.33 \times 10^4$ Pa). Subsequently, while flowing nitrogen gas through the inside, temperature was raised to 120° C. at a rate of 10° C./minute. A flow speed of the nitrogen gas was set at 100 cm$^3$/minute. Thereafter, at 120° C., the pressure in the vacuum furnace was reduced one more time to 100 mmHg, and the temperature was dropped to room temperature after holding the positive electrode C1 for 12 hours while leaving nitrogen in the furnace evacuated. In such a way, a positive electrode of this example was fabricated. Hereinafter, the positive electrode of this example is also referred to as a "positive electrode C11".

<Composition of Negative Electrode Slurry>

Negative electrode active material: natural graphite powder (100 parts by weight)

Conductive assistant: acetylene black (1.0 part by weight)

Binder: polyvinylidene fluoride (PVDF) (5.0 parts by weight)

Solvent: N-methyl-2-pyrrolidone (NMP) (97 parts by weight)

<Production of Negative Electrode Slurry>

Negative electrode slurry with the above-described composition was prepared as below. First, 5.0 parts by weight of the binder were dissolved into 50 parts by weight of the NMP, whereby a binder solution was prepared. Next, 55.0 parts by weight of the above-described binder solution were added to mixed powder of 1.0 part by weight of the conductive assistant and 100 parts by weight of the natural graphite powder, and a resultant was mixed by a planetary mixer (PVM100, made by Asada Iron Works Co., Ltd.). Thereafter, 47 parts by weight of the NMP were added to a mixed product, whereby the negative electrode slurry was prepared. Note that a solid concentration of the negative electrode slurry was 52 mass %.

<Coating/Drying of Negative Electrode Slurry>

On one surface of a current collector composed of electrolytic copper foil with a thickness of 10 μm, the above-described negative electrode slurry was coated by a die coater while running the current collector at a running speed of 1.5 m/minute. Subsequently, this current collector coated with the negative electrode slurry was dried in a hot air drying furnace, whereby an amount of NMP remaining in the electrode active material layer was set at 0.02 mass % or less. Note that a drying temperature was set at 100° C. to 110° C., and a drying time was set at two minutes. Moreover, in a similar way to the above, the negative electrode slurry was coated also on a back surface of the electrolytic copper foil, followed by drying. In such a way, a sheet-like negative electrode, which has negative electrode active material layers on both surfaces thereof, was formed.

<Press of Negative Electrode>

The sheet-like negative electrode was compressed by applying roller pressing thereto, followed by cutting. In such a way, a negative electrode was fabricated, in which weight of the active material layer on one surface was approximately 10 mg/cm$^2$, a thickness thereof was approximately 50 μm, and a density thereof was 1.45 g/cm$^3$. Hereinafter, this negative electrode is also referred to as a "negative electrode A1". When the surface of the negative electrode A1 was observed, an occurrence of a crack was not seen.

<Heat Treatment of Negative Electrode A1>

Next, the negative electrode A1 fabricated in the above-described procedure was subjected to drying treatment in a vacuum drying furnace. Specifically, after the negative electrode A1 was placed in an inside of the drying furnace, a pressure of the inside was reduced at room temperature (25° C.), and air in the drying furnace was removed until the pressure reached 100 mmHg ($1.33 \times 10^4$ Pa). Subsequently, while flowing nitrogen gas through the inside, temperature was raised to 135° C. at a rate of 10° C./minute. A flow speed of the nitrogen gas was set at 100 cm$^3$/minute. Thereafter, at 135° C., the pressure in the vacuum furnace was reduced one more time to 100 mmHg, and the temperature was dropped to room temperature after holding the negative electrode A1 for 12 hours while leaving nitrogen in the furnace evacuated. In such a way, a negative electrode of this example was fabricated. Hereinafter, the negative electrode of this example is also referred to as a "negative electrode A11".

<Fabrication of Battery>

First, a positive electrode C11, in which an area of the positive electrode active material layer is 3.4 cm (longitudinal)×5.0 cm (lateral), was prepared, and a positive electrode lead was welded to a current collector portion of this positive electrode C11. Moreover, a negative electrode A11, in which an area of the negative electrode active material layer is 3.8 cm (longitudinal)×5.5 cm (lateral), was prepared, and a negative electrode lead was welded to a current collector portion of this negative electrode A11.

Next, a porous polypropylene-made separator (S), in which a longitudinal length was 4.5 cm, a lateral length was 6.0 cm, a thickness was 25 μm, and a porosity was 55%, was prepared. Then, such porous polypropylene-made separators were sandwiched between the above-mentioned negative electrodes A11 to which the lead was welded and the above-mentioned positive electrode C11 to which the lead was welded, whereby a stacked body composed of five layers was fabricated. That is to say, the negative electrode A11, the separator (S), the positive electrode C11, the separator (S) and the negative electrode A11 were stacked on one another in this order, and the stacked body was fabricated.

Subsequently, both sides of the stacked body were sandwiched by aluminum laminated films, and three sides of the aluminum laminated films were thermally compressed, whereby the above-described stacked body was housed in an inside the two aluminum laminated films. Note that, as each of the aluminum laminated films, one with a size of 5.0 cm (longitudinal)×6.5 cm (lateral) was used.

0.5 cm$^3$ of an electrolytic solution was injected into the inside of the aluminum laminated films, and thereafter, one side as the rest was thermally compressed and sealed, whereby a laminate-type cell was fabricated. Note that, as the electrolytic solution, one was used, in which LiPF$_6$ was dissolved at a concentration of 1.0 mol/L into a mixed solution of ethylene carbonate (EC) and diethyl carbonate (DEC).

<Electrochemical Pretreatment>

In a similar way to Example 1-1, electrochemical pretreatment was performed. In such a way, a lithium ion secondary batter of this example was obtained. A part of specifications of the positive electrode active materials is shown in Table 3.

Examples 2-2 to 2-10

In Examples 2-2 to 2-10, similar operations to those of Example 2-1 were repeated except that positive electrode active materials 2 to 10 shown in Table 3 were used, respectively, whereby lithium ion secondary batteries of the respective examples were obtained. Note that the positive electrodes of Examples 2-2 to 2-10 are also referred to as "C12 to C20", respectively.

TABLE 3

| Positive electrode active material | Composition formula: $Li_{1.5}[Ni_aCo_bMn_c[Li]_d]O_3$ $0 < a < 1.4, 0 \leq b < c < 1.4, 0.1 < d \leq 0.4,$ $a + b + c + d = 1.5, 1.1 \leq a + b + c < 1.4$ | | | | | | Theoretical capacity caused by $Li_2MnO_3$ in plateau region (mAh/g) | Actual capacity of plateau region (mAh/g) | Pore volume (cm³/g) | BET specific surface area (m²/g) | Mean particle diameter (D50) (μm) | True density (g/cm³) |
|---|---|---|---|---|---|---|---|---|---|---|---|---|---|
| | a | b | c | d | a + b + c + d | a + b + c | | | (K) | | | | |
| 1 | 0.20 | 0.20 | 0.80 | 0.30 | 1.50 | 1.20 | 0.60 | 0.48 | 0.80 | 0.008 | 1.4 | 6.3 | 4.2 |
| 2 | 0.29 | 0.29 | 0.69 | 0.23 | 1.50 | 1.27 | 0.40 | 0.24 | 0.60 | 0.015 | 1.4 | 6.1 | 4.4 |
| 3 | 0.25 | 0.25 | 0.73 | 0.27 | 1.50 | 1.23 | 0.50 | 0.35 | 0.70 | 0.007 | 1.2 | 5.8 | 4.3 |
| 4 | 0.54 | 0.00 | 0.85 | 0.11 | 1.50 | 1.39 | 0.30 | 0.15 | 0.50 | 0.019 | 4.2 | 6.3 | 4.2 |
| 5 | 0.46 | 0.00 | 0.86 | 0.18 | 1.50 | 1.32 | 0.40 | 0.24 | 0.60 | 0.015 | 2.6 | 5.8 | 4.3 |
| 6 | 0.15 | 0.15 | 0.85 | 0.35 | 1.50 | 1.15 | 0.70 | 0.53 | 0.75 | 0.007 | 1.2 | 5.5 | 4.3 |
| 7 | 0.21 | 0.04 | 0.90 | 0.35 | 1.50 | 1.15 | 0.70 | 0.39 | 0.55 | 0.009 | 1.6 | 6.5 | 4.3 |
| 8 | 0.10 | 0.10 | 0.90 | 0.40 | 1.50 | 1.10 | 0.80 | 0.64 | 0.80 | 0.007 | 1.3 | 6.6 | 4.2 |
| 9 | 0.20 | 0.20 | 0.80 | 0.30 | 1.50 | 1.20 | 0.60 | 0.51 | 0.85 | 0.024 | 7.2 | 14.4 | 4.1 |
| 10 | 0.20 | 0.20 | 0.80 | 0.30 | 1.50 | 1.20 | 0.60 | 0.39 | 0.65 | 0.020 | 5.8 | 9.5 | 4.2 |

Comparative Example 2-1

Except that a positive electrode active material shown below was used, similar operations to those of Example 2-1 were repeated, whereby a lithium ion secondary battery of this example was obtained. Note that a positive electrode used in this example is also referred to as a "positive electrode C31".

Chemical formula: $LiMn_{2.0}O_{4.0}$(spinel structure)

Pore volume: 0.007 cm³/g
BET specific surface area: 0.8 m²/g
Mean particle diameter (D50): 9.1 μm
True density: 4.2 g/cm³

Comparative Example 2-2

Except that a positive electrode active material shown below was used, similar operations to those of Example 2-1 were repeated, whereby a lithium ion secondary battery of this example was obtained. Note that a positive electrode used in this example is also referred to as a "positive electrode C32".

Chemical formula: $LiNi_{(1/3)}Co_{(1/3)}Mn_{(1/3)}O_{4.0}$(layered structure)

Pore volume: 0.05 cm³/g
BET specific surface area: 3.5 m²/g
Mean particle diameter (D50): 3.2 μm
True density: 4.3 g/cm³

Reference Example 2-1

Except that a positive electrode active material shown below was used, similar operations to those of Example 2-1 were repeated, whereby a lithium ion secondary battery of this example was obtained. Note that a positive electrode used in this example is also referred to as a "positive electrode C33".

Chemical formula: $Li_{1.5}[Ni_{0.2}Co_{0.2}Mn_{0.8}[Li]_{0.3}]O_3$

Pore volume: 0.04 cm³/g
BET specific surface area: 1.5 m²/g
Mean particle diameter (D50): 6.8 μm
True density: 4.16 g/cm³

Reference Example 2-2

Except that a positive electrode active material shown below was used, similar operations to those of Example 2-1 were repeated, whereby a lithium ion secondary battery of this example was obtained. Note that a positive electrode used in this example is also referred to as a "positive electrode C34".

Chemical formula: $Li_{1.5}[Ni_{0.2}Co_{0.2}Mn_{0.8}[Li]_{0.3}]O_3$

Pore volume: 0.02 cm³/g
BET specific surface area: 9.2 m²/g
Mean particle diameter (D50): 14.6 μm
True density: 4.16 g/cm³

Reference Example 2-2

Except that a positive electrode active material shown below was used, similar operations to those of Example 2-1 were repeated, whereby a lithium ion secondary battery of this example was obtained. Note that a positive electrode used in this example is also referred to as a "positive electrode C35".

Chemical formula: $Li_{1.5}[Ni_{0.2}CO_{0.2}Mn_{0.8}[Li]_{0.3}]O_3$

Pore volume: 0.1 cm³/g
BET specific surface area: 9.8 m²/g
Mean particle diameter (D50): 21.4 μm
True density: 4.14 g/cm³

[Performance Evaluation of Battery]

<Spinel Structure Change Ratio (K)>

With regard to the positive electrode active materials of the respective examples, in a similar way to Example 1, the theoretical capacities caused by $Li_2MnO_3$ in the plateau region, the composition ratios of $Li_2MnO_3$, the actual capacities of the plateau regions, and the spinel structure change ratios were obtained. These are shown in Table 3.

<Capacity of Battery>

For the lithium ion secondary battery of each of the above-described examples, the following charge/discharge treatment was repeated 100 cycles at 55° C. A ratio of a discharge capacity in a 100-th cycle with respect to a discharge capacity in a first cycle (that is, the ratio is [discharge capacity in 100-th cycle]/[discharge capacity in first cycle]×100) was defined as the capacity retention ratio. In Table 4, the discharge capacity in the first cycle and the capacity retention ratio are also listed.

<Charge/Discharge Treatment>

The charge was performed by a constant current and constant voltage charge method, in which the charge was performed at a rate of 1.0 C until the maximum voltage of the battery became 4.5V, and thereafter, the maximum voltage was held for approximately 1 to 1.5 hours. Moreover, the discharge was performed by a constant current discharge method, in which the discharge was performed at a rate of 1.0 C until the minimum voltage of the battery became 2.0V. Both of the charge and the discharge were performed under room temperature (25° C.).

From Table 4, it is understood that Example 2-1 to Example 2-10, which belong to the scope of the present invention, have higher discharge capacities and capacity retention ratios in comparison with Comparative example 2-1 and Comparative example 2-2, which do not belong to the present invention.

TABLE 4

| Battery | | Discharge capacity in first cycle (mAh/g) | Capacity retention ratio (%) |
|---|---|---|---|
| Positive electrode | Negative electrode | | |
| Example 2-1 | C11 | A11 | 237 | 76 |
| Example 2-2 | C12 | A11 | 221 | 77 |
| Example 2-3 | C13 | A11 | 237 | 79 |
| Example 2-4 | C14 | A11 | 222 | 78 |
| Example 2-5 | C15 | A11 | 236 | 80 |
| Example 2-6 | C16 | A11 | 232 | 80 |
| Example 2-7 | C17 | A11 | 223 | 81 |
| Example 2-8 | C18 | A11 | 230 | 81 |
| Example 2-9 | C19 | A11 | 249 | 82 |
| Example 2-10 | C20 | A11 | 244 | 82 |
| Comparative example 2-1 | C31 | A11 | 104 | 53 |
| Comparative example 2-2 | C32 | A11 | 161 | 81 |
| Reference example 2-1 | C33 | A11 | 194 | 77 |
| Reference example 2-2 | C34 | A11 | 211 | 79 |
| Reference example 2-3 | C35 | A11 | 198 | 80 |

Note that, as a result of performing X-ray diffraction analysis for the transition metal oxide containing solid solution lithium, which is taken out by disassembling the lithium ion secondary battery of each of the examples and the reference examples, special peaks depending on the layered structure region and the spinel structure were observed. It was confirmed that, therefore, the transition metal oxide containing solid solution lithium according to each of the examples and the reference examples had the layered structure region and the spinel structure region.

Third Embodiment

Next, a description is made in detail of a transition metal oxide containing solid solution lithium, a non-aqueous electrolyte secondary battery positive electrode and a non-aqueous electrolyte secondary battery according to a third embodiment of the present invention.

First, a description is made in detail of the transition metal oxide containing solid solution lithium according to the third embodiment of the present invention. In a similar way to the first embodiment, the transition metal oxide containing solid solution lithium according to this embodiment contains the transition metal oxide containing lithium, which is represented by Chemical formula (1).

$$Li_{1.5}[Ni_aCo_bMn_c[Li]_d]O_3 \quad (1)$$

In Formula (1), Li denotes lithium, Ni denotes nickel, Co denotes cobalt, Mn denotes manganese, and O denotes oxygen. Moreover, a, b, c and d satisfy relationships: $0<a<1.4$; $0≤b<1.4$; $0<c<1.4$; $0.1<d≤0.4$; $a+b+c+d=1.5$; and $1.1≤a+b+c<1.4$.

Then, the transition metal oxide containing lithium according to this embodiment includes: a layered structure region; and a region ($Li_2MnO_3$ with a layered structure) changed to a spinel structure by being subjected to charge or charge/discharge in a predetermined potential range.

Moreover, such $Li_2MnO_3$ with the layered structure in the transition metal oxide containing lithium is changed to $LiMn_2O_4$ with a spinel structure. Then, when a ratio of the entire change from $Li_2MnO_3$ with the layered structure to $LiMn_2O_4$ with the spinel structure is defined to be 1, a spinel structure change ratio of the transition metal oxide containing lithium is 0.25 or more to less than 1.0.

Moreover, with regard to the transition metal oxide containing lithium according to this embodiment, a BET specific surface area thereof is 1 $m^2/g$ or more to 9 $m^2/g$ or less.

In a case of being used as the positive electrode active material of the lithium ion secondary battery, the transition metal oxide containing lithium, which is as described above, is capable of realizing high discharge capacity and capacity retention ratio, and accordingly, is suitably used as the lithium ion secondary battery positive electrode and the lithium ion secondary battery. As a result, the transition metal oxide containing lithium can be suitably used for a lithium ion secondary battery for a drive power supply or auxiliary power supply of a vehicle. Besides, the transition metal oxide containing lithium is sufficiently applicable also to a lithium ion secondary battery for home or a portable instrument.

In a similar way to the first embodiment, it is necessary that a, b, c and d satisfy relationships: $0<a<1.4$; $0≤b<1.4$; $0<c<1.4$; $0.1<d≤0.4$; $a+b+c+d=1.5$; and $1.1≤a+b+c<1.4$ in Chemical formula (1). In a case where such mathematical formulas are not satisfied, then there is a possibility that the crystal structure of the transition metal oxide containing lithium may not be stabilized.

Moreover, in a similar way to the first embodiment, the spinel structure change ratio does not become 1.0. Moreover, in a case where the spinel structure change ratio is less than 0.25, then what is obtained is only a transition metal oxide containing lithium, which is capable of realizing a discharge capacity and a capacity retention ratio, of which degrees are no larger than the conventional ones.

Moreover, preferably, with regard to the transition metal oxide containing lithium according to this embodiment, the BET specific surface area thereof is 1 $m^2/g$ or more to 9 $m^2/g$ or less. In a case where the BET specific surface area stays within this range, such lithium ion diffusivity in the transition metal oxide containing lithium is enhanced, and it becomes possible to obtain the high discharge capacity. Note that the BET specific surface area can be measured based on Japanese Industrial Standard JIS Z8830 in a similar way to the second embodiment.

Moreover, in a similar way to the first embodiment, in Chemical formula (1), preferably, a, b, c, and d satisfy relationships: $0<a<1.35$; $0≤b<1.35$; $0<c<1.35$; $0.15<d≤0.35$; $a+b+c+d=1.5$; and $1.15≤a+b+c<1.35$. Moreover, in the case where the charge or the charge/discharge in the predetermined potential range is performed, suitably, the spinel structure change ratio of the transition metal oxide containing lithium is 0.4 or more to less than 0.9. In addition, suitably, the BET specific surface area of the transition metal oxide containing lithium is 2 $m^2/g$ or more to 8 $m^2/g$ or less.

Furthermore, in a similar way to the first embodiment, in Chemical formula (1), preferably, a, b, c, and d satisfy relationships: $0<a<1.3$; $0≤b<1.3$; $0<c<1.3$; $0.15<d≤0.35$; $a+b+c+d=1.5$; and $1.2≤a+b+c<1.3$. Furthermore, more suitably, the spinel structure change ratio of the transition metal oxide containing lithium is 0.6 or more to 0.8 or less. In addition, more suitably, the BET specific surface area of the transition metal oxide containing lithium is 3 m$^2$/g or more to 6 m$^2$/g or less. In a case of being used as the positive electrode active material of the lithium ion secondary battery, the transition metal oxide containing lithium, which is as described above, is capable of realizing higher discharge capacity and capacity retention ratio, and accordingly, is suitably used as the lithium ion secondary battery positive electrode and the lithium ion secondary battery.

The transition metal oxide containing solid solution lithium according to this embodiment can be prepared by a method similar to that of the second embodiment.

Configurations of the lithium ion secondary battery positive electrode and the lithium ion secondary battery according to the third embodiment of the present invention are similar to those of the first embodiment except for using the above-mentioned transition metal oxide containing solid solution lithium, and accordingly, a description thereof is omitted.

Example 3

A description is made below in more detail of this embodiment by examples and comparative examples; however, the present invention is not limited to these examples. In this example, operations described below were performed, whereby laminate-type lithium ion secondary batteries as shown in FIG. 2 were fabricated, and performance thereof was evaluated.

Example 3-1

Synthesis of Positive Electrode Active Material 1

As each of the positive electrode active materials 1, the transition metal oxide containing lithium with a following chemical formula was synthesized by using the composite carbonate method. As starting materials, sulfates of nickel, cobalt and manganese were used, whereby an aqueous nickel sulfate solution, an aqueous cobalt sulfate solution and an aqueous manganese sulfate solution, in each of which a concentration was 2 mol/L, were prepared. As a precipitant, an aqueous sodium carbonate solution with a concentration of 2 mol/L was used, and as a pH control chemical, an aqueous ammonia solution with a concentration of 0.2 mol/L was used.

First, the aqueous nickel sulfate solution, the aqueous cobalt sulfate solution and the aqueous manganese sulfate solution were mixed with one another so that nickel, cobalt and manganese could achieve a ratio of the chemical formula shown below, whereby an aqueous composite sulfate solution was prepared. Then, an aqueous sodium carbonate solution was dropped into the aqueous composite sulfate solution stirred by a magnetic stirrer, whereby a precursor was precipitated. Thereafter, the precursor was aspirated and filtrated, and a precipitate deposited on filter paper was dried, whereby a precursor of composite hydroxide was obtained.

Thereafter, the obtained precursor of the composite hydroxide and lithium carbonate were mixed with each other so that the composite hydroxide and the lithium carbonate could achieve the ratio of the chemical formula shown below. Then, a resultant mixture was temporarily calcined at 500° C., and was mainly calcined at 800° C. for 12 hours in an inert gas atmosphere, whereby a target sample was obtained.

Chemical formula: $Li_{1.5}[Ni_{0.2}Co_{0.2}Mn_{0.8}[Li]_{0.3}]O_3$ (a+b+c+d=1.5, d=0.3, a+b+c=1.2)

BET specific surface area: 1.4 m$^2$/g

<Composition of Positive Electrode Slurry>

Positive electrode active material 1: $Li_{1.5}[Ni_{0.2}Co_{0.2}Mn_{0.8}[Li]_{0.3}]O_3$ (90 parts by weight)

Conductive assistant: scale-like black lead (1 part by weight), acetylene black (4 parts by weight)

Binder: polyvinylidene fluoride (PVDF) (5 parts by weight)

Solvent: N-methyl-2-pyrrolidone (NMP)

<Production/coating/drying of positive electrode slurry>90 parts by weight of the positive electrode active material, 1 part by weight of the scale-like black lead and 4 parts by weight of the acetylene black, which serve as the conductive assistants, and 5 parts by weight of the polyvinylidene fluoride were mixed with one another. Moreover, the N-methyl-2-pyrrolidone (NMP) was added to and mixed with this mixture, whereby positive electrode slurry was formed.

Next, on aluminum foil as the current collector, the obtained positive electrode slurry was coated so that an amount of the active material could be 6 mg per unit area of 100 mm$^2$, and was vacuum-dried at 100° C. Then, this resultant was pressed by using a roll press so that a density of the positive electrode active material layer could be 2.75 g/cm$^3$. Moreover, the resultant was punched into a circular shape, and a positive electrode with a diameter of 15 mm was obtained.

<Fabrication of Lithium Ion Secondary Battery>

The positive electrode and a negative electrode made of metal lithium were allowed to face each other, and two separators were arranged there between. Subsequently, such a stacked body of the negative electrode, the separators and the positive electrode was arranged on a bottom portion side of a coin cell. Moreover, a gasket for keeping insulating properties between the positive electrode and the negative electrode was mounted, and an electrolytic solution to be described below was injected by using a syringe. Thereafter, a spring and a spacer were stacked, and an upper side of the coin cell was superimposed and crimped, whereby hermetic sealing was made. In such a way, the lithium ion secondary battery of this example was fabricated. Note that, with regard to the used separator, a material thereof is polypropylene, and a thickness thereof is 20 μm. With regard to the coin cell, a standard thereof is CR2032, and a material thereof is stainless steel (SUS316). As the electrolytic solution, one was used, in which lithium phosphate hexafluoride (LiPF$_6$) as the supporting electrolyte was dissolved into an organic solvent so that a concentration thereof could be 1 mol/L. As the organic solvent, one was used, in which ethylene carbonate (EC) and diethyl carbonate (DEC) were mixed with each other in a ratio of EC:DEC=1:2 (volume ratio).

TABLE 5

| Positive electrode active material | Composition formula: $Li_{1.5}[Ni_aCo_bMn_c[Li]_d]O_3$ $0 < a < 1.4, 0 \le b < 1.4, 0 < c < 1.4, 0.1 < d \le 0.4$, $a + b + c + d = 1.5, 1.1 \le a + b + c < 1.4$ | | | | | | Theoretical capacity caused by $Li_2MnO_3$ in plateau region (mAh/g) | $Li_2MnO_3$ composition ratio (—) | Actual capacity of plateau region (mAh/g) | (K) | BET specific surface area ($m^2/g$) |
|---|---|---|---|---|---|---|---|---|---|---|---|
| | a | b | c | d | a + b + c + d | a + b + c | | | | | |
| Example 3-1 | 1 | 0.375 | 0 | 0.875 | 0.25 | 1.5 | 1.25 | 369 | 0.5 | 69.158 | 0.302 | 1.48 |
| Example 3-2 | 2 | 0.375 | 0 | 0.875 | 0.25 | 1.5 | 1.25 | 369 | 0.5 | 119.309 | 0.521 | 5.80 |
| Example 3-3 | 3 | 0.375 | 0 | 0.875 | 0.25 | 1.5 | 1.25 | 369 | 0.5 | 137.4 | 0.600 | 7.00 |
| Example 3-4 | 4 | 0.2 | 0.2 | 0.8 | 3 | 1.5 | 1.2 | 386.8 | 0.6 | 166.254 | 0.605 | 1.50 |
| Example 3-5 | 5 | 0.2 | 0.2 | 0.8 | 3 | 1.5 | 1.2 | 386.8 | 0.6 | 192.36 | 0.700 | 4.20 |
| Example 3-6 | 6 | 0.2 | 0.2 | 0.8 | 3 | 1.5 | 1.2 | 386.8 | 0.6 | 240.7248 | 0.876 | 9.10 |

<Electrochemical Pretreatment>

In a similar way to Example 1-1, electrochemical pretreatment was performed. In such a way, a lithium ion secondary batter of this example was obtained. A part of specifications of the positive electrode active materials is shown in Table 5, above.

Examples 3-2 to 3-6

Similar operations to those of Example 3-1 were repeated except that positive electrode active materials 2 to 6 shown in Table 5 were used, whereby lithium ion secondary batteries of the respective examples were obtained.

[Performance Evaluation of Battery]

<Spinel Structure Change Ratio (K)>

With regard to the positive electrode active materials of the respective examples, in a similar way to Example 1, the theoretical capacities caused by $Li_2MnO_3$ in the plateau region, the composition ratios of $Li_2MnO_3$, the actual capacities of the plateau regions, and the spinel structure change ratios were obtained. These are shown in Table 5.

<Capacity of Battery>

For the lithium ion secondary battery of each of the above-described examples, the following charge/discharge treatment was repeated 100 cycles at 55° C. A ratio of a discharge capacity in a 100-th cycle with respect to a discharge capacity in a first cycle (that is, the ratio is [discharge capacity in 100-th cycle]/[discharge capacity in first cycle]×100) was defined as the capacity retention ratio.

Figure 5:
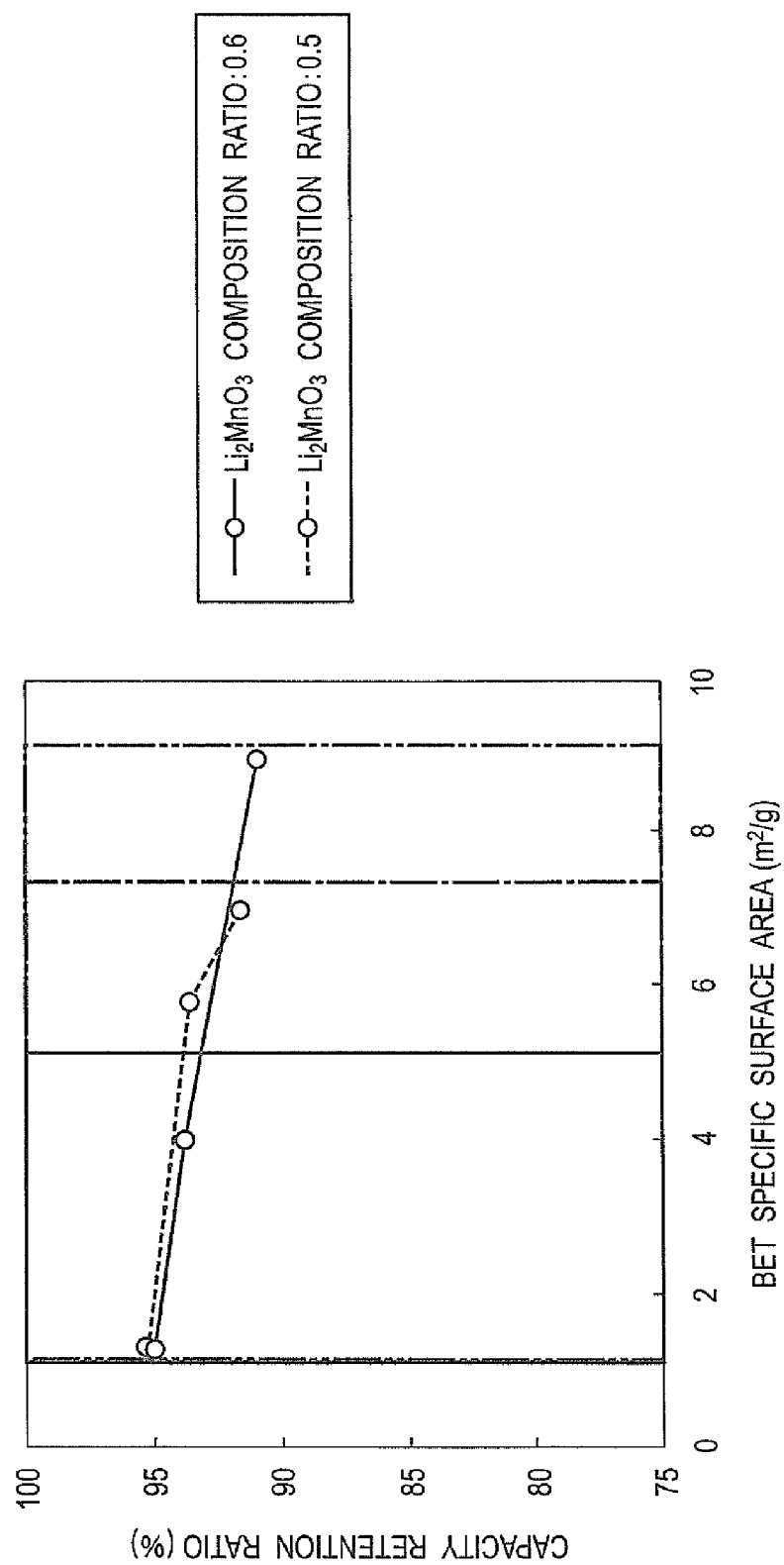
FIG. 5 is a graph showing relationships between a BET specific surface area and the capacity retention ratio in Example 3 of a third embodiment.
Figure 6:
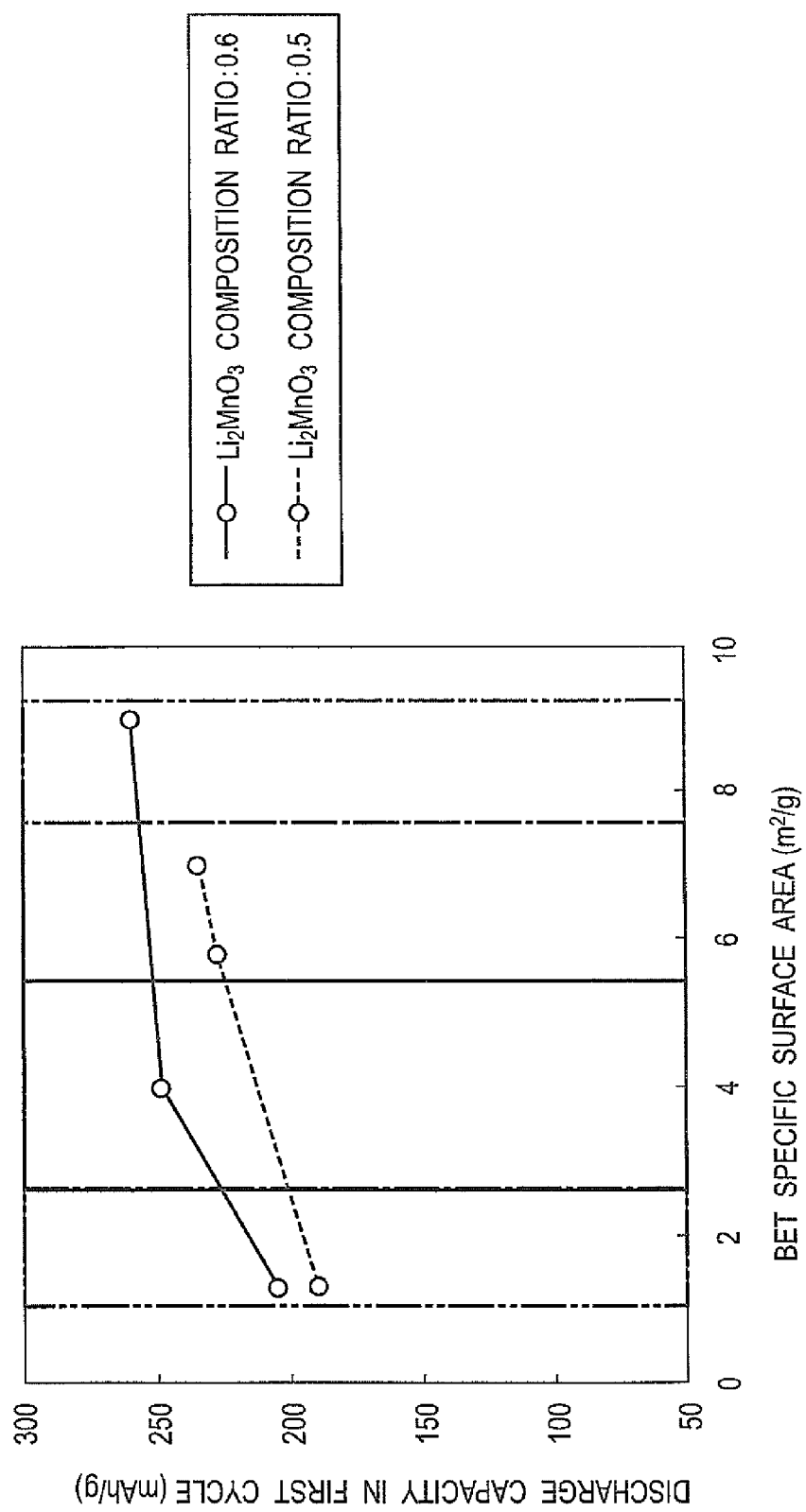
FIG. 6 is a graph showing relationships between the BET specific surface area and the discharge capacity in Example 3 of the third embodiment.

FIG. 5 shows relationships between the BET specific surface areas of the respective examples and the capacity retention ratios after the 100 cycles. Moreover, FIG. 6 shows relationships between the BET specific surface areas of the respective examples and the discharge capacities in the first cycle. Note that, in FIG. 5 or FIG. 6, a range surrounded by a chain double-dashed line represents a preferable range from a viewpoint of the capacity retention ratio or the discharge capacity, and a range surrounded by an alternate long and short dashed line represents a more preferable range from the capacity retention ratio or the discharge capacity. Furthermore, in FIG. 5 or FIG. 6, a range surrounded by a solid line represents a still more preferable range from the viewpoint of the capacity retention ratio or the discharge capacity.

<Charge/Discharge Treatment>

The charge was performed by a constant current and constant voltage charge method, in which the charge was performed at a rate of 1.0 C until the maximum voltage of the battery became 4.5V, and thereafter, the maximum voltage was held for approximately 1 to 1.5 hours. Moreover, the discharge was performed by a constant current discharge method, in which the discharge was performed at a rate of 1.0 C until the minimum voltage of the battery became 2.0V. Both of the charge and the discharge were performed under room temperature.

From FIG. 5 and FIG. 6, it is understood that Example 3-1 to Example 3-6, which belong to the scope of the present invention, have high discharge capacities and capacity retention ratios. Moreover, from FIG. 5, suitable ranges of the BET specific surface areas and the capacity retention ratios after 100 cycles are understood. Furthermore, from FIG. 6, suitable ranges of the BET specific surface areas and the initial discharge capacities are understood.

From these results, it is understood that the discharge capacity and capacity retention ratio of the transition metal oxide containing solid solution lithium depends on the composition, spinel change ratio and BET specific surface area of the transition metal oxide containing solid solution lithium.

Note that, as a result of performing X-ray diffraction analysis for the transition metal oxide containing solid solution lithium, which is taken out by disassembling the lithium ion secondary battery of each of the examples, special peaks depending on the layered structure region and the spinel structure were observed. It was confirmed that, therefore, the transition metal oxide containing solid solution lithium according to each of the examples had the layered structure region and the spinel structure region.

Fourth Embodiment

Next, a description is made in detail of a transition metal oxide containing solid solution lithium, a non-aqueous electrolyte secondary battery positive electrode and a non-aqueous electrolyte secondary battery according to a fourth embodiment of the present invention.

First, a description is made in detail of the transition metal oxide containing solid solution lithium according to the fourth embodiment of the present invention. The transition metal oxide containing solid solution lithium according to this embodiment contains a first transition metal oxide and a second transition metal oxide, which are represented by Chemical formula (1).

$$Li_{1.5}[Ni_aCo_bMn_c[Li]_d]O_3 \qquad (1)$$

In Formula (1), Li denotes lithium, Ni denotes nickel, Co denotes cobalt, Mn denotes manganese, and O denotes oxygen. Moreover, a, b, c and d satisfy relationships: $0<a<1.4$; $0\le b<1.4$; $0<c<1.4$; $0.1<d\le 0.4$; $a+b+c+d=1.5$; and $1.1\le a+b+c<1.4$.

Then, each of the first and second transition metal oxides, which contains lithium, according to this embodiment includes: a layered structure region; and a region ($Li_2MnO_3$ with a layered structure) changed to a spinel structure by being subjected to charge or charge/discharge in a predetermined potential range.

Moreover, such $Li_2MnO_3$ with the layered structure in each of the first and second transition metal oxides, which contains lithium, is changed to $LiMn_2O_4$ with a spinel structure. Then, when a ratio of the entire change from $Li_2MnO_3$ with the layered structure to $LiMn_2O_4$ with the spinel structure is defined to be 1, a spinel structure change ratio of each of the first and second transition metal oxides, which contains lithium, is 0.25 or more to less than 1.0.

Then, with regard to the transition metal oxide containing solid solution lithium, a BET specific surface area of the first transition metal oxide containing lithium is 1.0 $m^2$/g or more to 4.0 $m^2$/g or less, and a BET specific surface area of the second transition metal oxide containing lithium is more than 4.0 $m^2$/g to 8.0 $m^2$/g or less. As described above, two types of the transition metal oxide containing lithium, which are different in BET specific surface area, are contained, whereby lithium ion diffusivity in the transition metal oxide containing solid solution lithium is enhanced, and it becomes possible to enhance the discharge capacity in charge/discharge at a high rate. This is because the first transition metal oxide containing lithium is effective for enhancing the discharge capacity and the second transition metal oxide containing lithium is effective for enhancing the rate characteristics.

Note that the first transition metal oxide containing lithium and the second transition metal oxide containing lithium may have the same composition or may have different compositions. That is to say, the transition metal oxide containing solid solution lithium according to this embodiment contains at least two types of the transition metal oxides containing lithium, which are different in BET specific surface area.

In a case of being used as the positive electrode active material of the lithium ion secondary battery, the transition metal oxide containing solid solution lithium, which is as described above, is capable of realizing high discharge capacity and capacity retention ratio in charge/discharge at a rate as high as 1.0 C and 2.5 C. Therefore, the transition metal oxide containing solid solution lithium is suitably used as the lithium ion secondary battery positive electrode and the lithium ion secondary battery. As a result, the transition metal oxide containing solid solution lithium can be suitably used for a lithium ion secondary battery for a drive power supply or auxiliary power supply of a vehicle. Besides, the transition metal oxide containing solid solution lithium is sufficiently applicable also to a lithium ion secondary battery for home or a portable instrument.

In a similar way to the first embodiment, it is necessary that a, b, c and d satisfy relationships: $0<a<1.4$; $0\leq b<1.4$; $0<c<1.4$; $0.1<d\leq 0.4$; $a+b+c+d=1.5$; and $1.1\leq a+b+c<1.4$ in Chemical formula (1). In a case where such mathematical formulas are not satisfied, then there is a possibility that crystal structures of the first and second transition metal oxides, which contain lithium, may not be stabilized.

Moreover, in a similar way to the first embodiment, the spinel structure change ratio does not become 1.0. Moreover, in a case where the spinel structure change ratio is less than 0.25, then what is obtained is only first and second transition metal oxides containing lithium, which are capable of realizing a discharge capacity and a capacity retention ratio, of which degrees are no larger than the conventional ones.

Moreover, in a similar way to the first embodiment, in Chemical formula (1), preferably, a, b, c, and d satisfy relationships: $0<a<1.35$; $0\leq b<1.35$; $0<c<1.35$; $0.15<d\leq 0.35$; $a+b+c+d=1.5$; and $1.15\leq a+b+c<1.35$. Moreover, in the case where the charge or the charge/discharge in the predetermined potential range is performed, suitably, the spinel structure change ratio of the first and second transition metal oxides containing lithium is 0.4 or more to less than 0.9.

Furthermore, in a similar way to the first embodiment, in Chemical formula (1), preferably, a, b, c, and d satisfy relationships: $0<a<1.3$; $0\leq b<1.3$; $0<c<1.3$; $0.15<d\leq 0.35$; $a+b+c+d=1.5$; and $1.2\leq a+b+c<1.3$. Furthermore, more suitably, the spinel structure change ratio of the first and second transition metal oxides containing lithium is 0.6 or more to 0.8 or less.

Moreover, preferably, the transition metal oxide containing solid solution lithium according to this embodiment contains first and second transition metal oxides containing lithium, in each of which a pore volume measured by nitrogen is 0.025 $cm^3$/g or less when the relative pressure is 0.98 to 0.99. In a case where the pore volume is 0.025 $cm^3$/g or less, it becomes possible to obtain a transition metal oxide containing solid solution lithium, which is capable of realizing higher discharge capacity and capacity retention ratio than the conventional one. Note that the pore volume can be measured based on Japanese Industrial Standard JIS Z8831-2 in a similar way to the second embodiment.

Moreover, with regard to the above-described first transition metal oxide containing lithium, preferably, a 50%-penetration particle diameter (median diameter, D50) thereof is less than 15 μm, and with regard to the above-described second transition metal oxide containing lithium, preferably, a 50%-penetration particle diameter thereof is less than 10 μm. More preferably, the transition metal oxide containing solid solution lithium has particles with a particle diameter of less than 1 μm. That is to say, preferably, at least one of the first and second transition metal oxides containing lithium includes the particles with a particle diameter of less than 1 μm. By using the transition metal oxide containing lithium, which has such a particle diameter as described above, it becomes easy to control a porosity of the positive electrode active material layer, and the permeability of the non-aqueous electrolytic solution can be enhanced. Then, since the permeability of the non-aqueous electrolytic solution is enhanced, it becomes possible to reduce direct current resistance of the positive electrode active material layer. Note that the 50%-penetration particle diameter can be obtained by a particle size distribution measured by the dynamic light scattering in a similar way to the second embodiment.

Moreover, suitably, with regard to each of the first transition metal oxide containing lithium and the second transition metal oxide containing lithium, a liquid absorption amount thereof for N-methyl-2-pyrrolidone is 0.5 $cm^3$/g or less. In this case, the permeability of the non-aqueous electrolytic solution and the lithium ion diffusivity in the transition metal oxide containing lithium are enhanced, and accordingly, it becomes possible to further enhance the discharge capacity and the capacity retention ratio.

Furthermore, suitably, with regard to each of the first transition metal oxide containing lithium and the second transition metal oxide containing lithium, a true density thereof is 4.1 $g/cm^3$ or more to 4.6 $g/cm^3$ or less. In a case where the true density is 4.1 $g/cm^3$ or more, the weight (filler content) per unit volume of the transition metal oxide containing lithium is increased, and it becomes possible to enhance the discharge capacity. Moreover, in a case where the true density is 4.6 $g/cm^3$ or less, such a pore volume of the positive electrode active material layer is increased, and the permeability and lithium ion diffusivity of the non-aqueous electrolytic solution can be enhanced. Note that the true density can be obtained by a liquid phase substitution method (pycnometer method) in a similar way to the second embodiment.

The transition metal oxide containing solid solution lithium according to this embodiment can be prepared by a method similar to that of the second embodiment. Note that, by setting a crystallite size of a mixture of the raw materials at 10 nm or more to 100 nm or less, it is possible to adjust the BET specific surface areas of the first and second transition metal oxides containing lithium.

Note that, in order to obtain a desired spinel structure change ratio, preferably, treatment as described below is performed in a similar way to the first embodiment. In the lithium ion secondary battery using the above-described transition metal oxide containing solid solution lithium for the positive electrode, charge or charge/discharge, in which a maximum potential of the positive electrode in the predetermined potential range is 4.3V or more to less than 4.8V in conversion to the lithium metal counter electrode, is performed. In such a way, the transition metal oxide containing solid solution lithium, in which the spinel structure change ratio is 0.25 or more to less than 1.0, can be obtained.

Configurations of the lithium ion secondary battery positive electrode and the lithium ion secondary battery according to the fourth embodiment of the present invention are similar to those of the first embodiment except for using the above-mentioned transition metal oxide containing solid solution lithium, and accordingly, a description thereof is omitted.

Example 4

A description is made below in more detail of this embodiment by examples and comparative examples; however, the present invention is not limited to these examples. In this example, operations described below were performed, whereby laminate-type lithium ion secondary batteries as shown in FIG. 2 were fabricated, and performance thereof was evaluated.

Example 4-1

Synthesis of Positive Electrode Active Material 1 and Positive Electrode Active Material 2

As each of the positive electrode active materials 1 and the positive electrode active materials 2, a transition metal oxide containing lithium with a following chemical formula was synthesized by using the composite carbonate method. As starting materials, sulfates of nickel, cobalt and manganese were used, whereby an aqueous nickel sulfate solution, an aqueous cobalt sulfate solution and an aqueous manganese sulfate solution, in each of which a concentration was 2 mol/L, were prepared. As a precipitant, an aqueous sodium carbonate solution with a concentration of 2 mol/L was used, and as a pH control chemical, an aqueous ammonia solution with a concentration of 0.2 mol/L was used.

First, the aqueous nickel sulfate solution, the aqueous cobalt sulfate solution and the aqueous manganese sulfate solution were mixed with one another so that nickel, cobalt and manganese could achieve a ratio of a chemical formula shown below, whereby an aqueous composite sulfate solution was prepared. Then, an aqueous sodium carbonate solution was dropped into the aqueous composite sulfate solution stirred by a magnetic stirrer, whereby a precursor was precipitated. Thereafter, the precursor was aspirated and filtrated, and a precipitate deposited on filter paper was dried, whereby a precursor of composite hydroxide was obtained.

Thereafter, the obtained precursor of the composite hydroxide and lithium carbonate were mixed with each other so that the composite hydroxide and the lithium carbonate could achieve the ratio of the chemical formula shown below. Then, a resultant mixture was temporarily calcined at 500° C., and was mainly calcined at 800° C. for 12 hours in an inert gas atmosphere, whereby a target sample was obtained.

<Composition and Physical Properties of Positive Electrode Active Material 1>

Chemical formula: $Li_{1.5}[Ni_{0.2}Co_{0.2}Mn_{0.8}[Li]_{0.3}]O_3$ (a+b+c+d=1.5, d=0.3, a+b+c=1.2)
Pore volume: 0.008 cm$^3$/g
BET specific surface area: 1.07 m$^2$/g
Mean particle diameter (D50): 6.6 μm
True density: 4.2 g/cm$^3$ <Composition and Physical Properties of Positive Electrode Active Material 2>

Chemical formula: $Li_{1.5}[Ni_{0.2}Co_{0.2}Mn_{0.8}[Li]_{0.3}]O_3$ (a+b+c+d=1.5, d=0.3, a+b+c=1.2)
Pore volume: 0.024 cm$^3$/g
BET specific surface area: 7.2 m$^2$/g
Mean particle diameter (D50): 14.4 μm
True density: 4.1 g/cm$^3$ <Composition of Positive Electrode Slurry>

Positive electrode active material: positive electrode active material 1 (50 parts by weight), positive electrode active material 2 (50 parts by weight)

Conductive assistant: scale-like black lead (1.0 part by weight), acetylene black (3.0 parts by weight)

Binder: polyvinylidene fluoride (PVDF) (3.0 parts by weight)

Solvent: N-methyl-2-pyrrolidone (NMP) (65 parts by weight)

<Production of Positive Electrode Slurry>

Positive electrode slurry with the above-described composition was prepared as below. First, 3.0 parts by weight of the binder were dissolved into 30 parts by weight of the NMP, whereby a binder solution was prepared. Next, 33.0 parts by weight of the above-described binder solution were added to mixed powder of 4.0 parts by weight of the conductive assistant and 100 parts by weight of the positive electrode active material powder, and a resultant was mixed by a planetary mixer (PVM100, made by Asada Iron Works Co., Ltd.). Thereafter, 35 parts by weight of the NMP were added to a mixed product, whereby the positive electrode slurry was prepared. Note that a solid concentration of the positive electrode slurry was 62 mass %.

<Coating/Drying of Positive Electrode Slurry>

On one surface of a current collector composed of aluminum foil with a thickness of 20 μm, the above-described positive electrode slurry was coated by a die coater while running the current collector at a running speed of 1 m/minute. Subsequently, this current collector coated with the positive electrode slurry was dried in a hot air drying furnace, whereby an amount of NMP remaining in the electrode active material layer was set at 0.02 mass % or less. Note that a drying temperature was set at 100° C. to 110° C., and a drying time was set at three minutes. Moreover, in a similar way to the above, the positive electrode slurry was coated also on a back surface of the aluminum foil, followed by drying. In such a way, a sheet-like positive electrode, which has positive electrode active material layers on both surfaces thereof, was formed.

<Press of Positive Electrode>

The sheet-like positive electrode was compressed by applying roller pressing thereto, followed by cutting. In such a way, a positive electrode was fabricated, in which weight of the active material layer on one surface was approximately 10 mg/cm², a thickness thereof was approximately 40 μm, and a density thereof was 2.80 g/cm³. Hereinafter, this positive electrode is also referred to as a "positive electrode C1". When the surface of the positive electrode C1 was observed, an occurrence of a crack was not seen.

<Heat Treatment of Positive Electrode C1>

Next, the positive electrode C1 fabricated in the above-described procedure was subjected to heat treatment in a vacuum drying furnace. Specifically, after the positive electrode C1 was placed in an inside of the drying furnace, a pressure of the inside was reduced at room temperature (25° C.), and air in the drying furnace was removed until the pressure reached 100 mmHg (1.33×10⁴ Pa). Subsequently, while flowing nitrogen gas through the inside, temperature was raised to 120° C. at a rate of 10° C./minute. A flow speed of the nitrogen gas was set at 100 cm³/minute. Thereafter, at 120° C., the pressure in the vacuum furnace was reduced one more time to 100 mmHg, and the temperature was dropped to room temperature after holding the positive electrode C1 for 12 hours while leaving nitrogen in the furnace evacuated. In such a way, a positive electrode of this example was fabricated. Hereinafter, the positive electrode of this example is also referred to as a "positive electrode C11".

<Fabrication of Battery>

First, a positive electrode C11, in which an area of the positive electrode active material layer is 3.4 cm (longitudinal)×5.0 cm (lateral), was prepared, and a positive electrode lead was welded to a current collector portion of this positive electrode C11. Moreover, the negative electrode A11 used in Example 2, in which an area of the negative electrode active material layer is 3.8 cm (longitudinal)×5.5 cm (lateral), was prepared, and a negative electrode lead was welded to a current collector portion of this negative electrode A11.

Next, the porous polypropylene-made separator (S) used in Example 2 was prepared. Then, in a similar way to Example 2, the negative electrode A11, the separator (S), the positive electrode C11, the separator (S) and the negative electrode A11 were stacked on one another in this order, and a stacked body was fabricated.

Subsequently, both sides of the stacked body were sandwiched by the aluminum laminated films used in Example 2, and three sides of the aluminum laminated films were thermally compressed, whereby the above-described stacked body was housed in an inside the two aluminum laminated films. 0.5 cm³ of the electrolytic solution used in Example 2 was injected into the inside of the aluminum laminated films, and thereafter, one side as the rest was thermally compressed and sealed, whereby a laminate-type cell was fabricated.

<Electrochemical Pretreatment>

In a similar way to Example 1-1, electrochemical pretreatment was performed. In such a way, a lithium ion secondary batter of this example was obtained. A part of specifications of the positive electrode active materials is shown in Table 6.

| Positive electrode active material | Composition formula: $Li_{1.5}[Ni_aCo_bMn_c[Li]_d]O_3$ $0 < a < 1.4, 0 \le b < 1.4, 0 < c < 1.4, 0.1 < d \le 0.4,$ $a + b + c + d = 1.5, 1.1 \le a + b + c < 1.4$ | | | | | | Theoretical capacity caused by $Li_2MnO_3$ in plateau region (mAh/g) | Actual capacity of plateau region (mAh/g) | (K) | Pore volume (cm³/g) | BET specific surface area (m²/g) | Mean particle diameter (D50) (μm) | True density (g/cm³) |
|---|---|---|---|---|---|---|---|---|---|---|---|---|---|
| | a | b | c | d | a + b + c + d | a + b + c | | | | | | | |
| 1 | 0.20 | 0.20 | 0.80 | 0.30 | 1.50 | 1.20 | 0.60 | 0.48 | 0.80 | 0.008 | 1.4 | 6.3 | 4.2 |
| 2 | 0.20 | 0.20 | 0.80 | 0.30 | 1.50 | 1.20 | 0.60 | 0.51 | 0.85 | 0.024 | 7.2 | 14.4 | 4.1 |
| 3 | 0.25 | 0.25 | 0.73 | 0.27 | 1.50 | 1.23 | 0.50 | 0.35 | 0.70 | 0.007 | 1.2 | 5.8 | 4.3 |
| 4 | 0.46 | 0.00 | 0.86 | 0.18 | 1.50 | 1.32 | 0.40 | 0.24 | 0.60 | 0.015 | 2.6 | 5.8 | 4.3 |

Example 4-2

Weight of the positive electrode active material 1 is set at 30 parts by weight, and weight of the positive electrode active material 2 was set at 70 parts by weight. Except for the above, similar operations to those of Example 4-1 were repeated, whereby a lithium ion secondary battery of this example were obtained. Note that the positive electrode used in this example is also referred to as a "positive electrode C12".

Example 4-3

Weight of the positive electrode active material 1 is set at 70 parts by weight, and weight of the positive electrode active material 2 was set at 30 parts by weight. Except for the above, similar operations to those of Example 4-1 were repeated, whereby a lithium ion secondary battery of this example were obtained. Note that the positive electrode used in this example is also referred to as a "positive electrode C13".

Example 4-4

Similar operations to those of Example 4-1 were repeated except for using a positive electrode active material 3, which is shown below, in place of the positive electrode active material 2, whereby a lithium ion secondary battery of this example were obtained. Note that the positive electrode used in this example is also referred to as a "positive electrode C14". The positive electrode active material 3 was prepared in a similar way to the positive electrode active material 1 except that the lithium carbonate, the aqueous nickel sulfate solution, the aqueous cobalt sulfate solution and the aqueous manganese sulfate solution were mixed with one another so that lithium, nickel, cobalt and manganese could achieve a ratio of a chemical formula shown below.

<Composition and Physical Properties of Positive Electrode Active Material 3>

Chemical formula: $Li_{1.5}[Ni_{0.25}Co_{0.25}Mn_{0.73}[Li]_{0.27}]O_3$ (a+b+c+d=1.5, d=0.27, a+b+c=1.23)
Pore volume: 0.007 cm³/g
BET specific surface area: 1.2 m²/g
Mean particle diameter (D50): 5.8 μm
True density: 4.3 g/cm³

Example 4-5

Similar operations to those of Example 4-1 were repeated except for using a positive electrode active material 4, which is shown below, in place of the positive electrode active material 2, whereby a lithium ion secondary battery of this example were obtained. Note that the positive electrode used in this example is also referred to as a "positive electrode C15". Note that the positive electrode active material 4 was prepared in a similar way to the positive electrode active material 1 except that the lithium carbonate, the aqueous nickel sulfate solution and the aqueous manganese sulfate solution were mixed with one another so that lithium, nickel and manganese could achieve a ratio of a chemical formula shown below.

<Composition and Physical Properties of Positive Electrode Active Material 4>

$Li_{1.5}[Ni_{0.46}Mn_{0.86}[Li]_{0.18}]O_3$   Chemical formula:

(a+b+c+d=1.5, d=0.18, a+b+c=1.32)
Pore volume: 0.015 cm$^3$/g
BET specific surface area: 2.6 m$^2$/g
Mean particle diameter (D50): 5.8 μm
True density: 4.3 g/cm$^3$ Comparative Example 4-1

Except that a positive electrode active material shown below was used, similar operations to those of Example 4-1 were repeated, whereby a lithium ion secondary battery of this example was obtained. Note that a positive electrode used in this example is also referred to as a "positive electrode C31".

$LiMn_{2.0}O_{4.0}(spinel\ structure)$   Chemical formula:

Pore volume: 0.01 cm$^3$/g
BET specific surface area: 0.8 m$^2$/g
Mean particle diameter (D50): 9.1 μm
True density: 4.20 g/cm$^3$ Comparative Example 4-2

Except that a positive electrode active material shown below was used, similar operations to those of Example 4-1 were repeated, whereby a lithium ion secondary battery of this example was obtained. Note that a positive electrode used in this example is also referred to as a "positive electrode C32".

$LiNi_{(1/3)}Co_{(1/3)}Mn_{(1/3)}O_{4.0}(layered\ structure)$   Chemical formula:

Pore volume: 0.05 cm$^3$/g
BET specific surface area: 3.5 m$^2$/g
Mean particle diameter (D50): 3.2 μm
True density: 4.3 g/cm$^3$ Reference Example 4-1

Except that the positive electrode active material 2 was not used but the positive electrode active material 1 was used by 100 parts by weight, similar operations to those of Example 4-1 were repeated, whereby a lithium ion secondary battery of this example was obtained. Note that a positive electrode used in this example is also referred to as a "positive electrode C33".

[Performance Evaluation of Battery]
<Capacity of Battery>

The lithium ion secondary batteries of the above-described respective examples were prepared two by two. Then, for one of the lithium ion secondary batteries, the following charge/discharge treatment 1 was repeated 100 cycles at 55° C. Moreover, for other of the lithium ion secondary batteries, the following charge/discharge treatment 2 was repeated 100 cycles at 55° C. With regard to the lithium ion secondary battery subjected to the charge/discharge treatment 1, a ratio of a discharge capacity in a 100-th cycle with respect to a discharge capacity in a first cycle (that is, the ratio is [discharge capacity in 100-th cycle]/[discharge capacity in first cycle]×100) was defined as the capacity retention ratio. Together with specifications of the lithium ion secondary batteries of the respective examples, Table 7 shows such discharge capacities and capacity retention ratios in the first cycle with regard to the lithium ion secondary batteries subjected to the charge/discharge treatment 1 and such discharge capacities in the first cycle with regard to the lithium ion secondary batteries subjected to the charge/discharge treatment 2.

<Charge/Discharge Treatment 1>

The charge was performed by a constant current and constant voltage charge method, in which the charge was performed at a rate of 1.0 C until the maximum voltage of the battery became 4.5V, and thereafter, the maximum voltage was held for approximately 1 to 1.5 hours. Moreover, the discharge was performed by a constant current discharge method, in which the discharge was performed at a rate of 1.0 C until the minimum voltage of the battery became 2.0V. Both of the charge and the discharge were performed under room temperature (25° C.).

<Charge/Discharge Treatment 2>

The charge was performed by a constant current and constant voltage charge method, in which the charge was performed at a rate of 1.0 C until the maximum voltage of the battery became 4.5V, and thereafter, the maximum voltage was held for approximately 1 to 1.5 hours. Moreover, the discharge was performed by a constant current discharge method, in which the discharge was performed at a rate of 2.5 C until the minimum voltage of the battery became 2.0V. Both of the charge and the discharge were performed under room temperature (25° C.).

TABLE 7

| | Cell | | Discharge capacity | Discharge capacity | Capacity retention |
|---|---|---|---|---|---|
| | Positive electrode | Negative electrode | at 1.0 C (mAh/g) | at 2.5 C (mAh/g) | ratio (%) |
| Example 4-1 | C11 | A11 | 243 | 182 | 76 |
| Example 4-2 | C12 | A11 | 245 | 196 | 77 |
| Example 4-3 | C13 | A11 | 241 | 169 | 79 |
| Example 4-4 | C14 | A11 | 243 | 175 | 78 |
| Example 4-5 | C15 | A11 | 243 | 189 | 80 |
| Comparative example 4-1 | C31 | A11 | 104 | 73 | 53 |
| Comparative example 4-2 | C32 | A11 | 161 | 113 | 81 |
| Reference example 4-1 | C33 | A11 | 242 | 169 | 77 |

From Table 7, it is understood that Example 4-1 to Example 4-5, which belong to the scope of the present invention, have higher discharge capacities and capacity retention ratios in comparison with Comparative example 4-1 and Comparative example 4-2, which do not belong to the present invention.

Note that, as a result of performing X-ray diffraction analysis for the transition metal oxide containing solid solution lithium, which is taken out by disassembling the lithium ion secondary battery of each of the examples and the reference example, special peaks depending on the layered structure region and the spinel structure were observed. It was confirmed that, therefore, the transition metal oxide containing solid solution lithium according to each of the examples and the reference example had the layered structure region and the spinel structure region.

The description has been made above of the present invention along the embodiments and the example; however, it is obvious for those skilled in the art that the present invention is not limited to the descriptions of these, and is modifiable in various ways.

That is to say, in the above-described embodiments and examples, the laminate-type battery and the coin-type battery are illustrated as the lithium ion secondary battery; however, the present invention is not limited to this. That is to say, the present invention can also be applied to forms and structures, which have been heretofore known in public, such as a button-type battery and a rectangular or cylindrical can-type battery.

Moreover, the present invention can be applied not only to the above-mentioned stack-type (flat-type) battery but also to forms and structures, which have been heretofore known in public, such as a winding-type (cylinder-type) battery.

Furthermore, in a case of viewing the present invention in an electric connection form (electrode structure) in the lithium ion secondary battery, the present invention can be applied not only to the above-mentioned ordinary-type (internal parallel connection-type) battery but also to forms and structures, which have been heretofore known in public, such as a bipolar (internal serial connection-type) battery. Note that, in general, a battery element in the bipolar battery has a configuration in which a plurality of bipolar electrodes and a plurality of electrolyte layers are stacked on each other, each of the bipolar electrodes having a configuration in which a negative electrode active material layer is formed on one surface of a current collector and a positive electrode active material layer is formed on other surface thereof.

The transition metal oxide containing solid solution lithium according to the present invention is capable of realizing high discharge capacity and capacity retention ratio by having the above-mentioned configuration. Moreover, the non-aqueous electrolyte secondary battery positive electrode and the non-aqueous electrolyte secondary battery, each of which uses the transition metal oxide containing solid solution lithium according to the present invention, can be used for a driving power supply or an auxiliary power supply for a motor of an electric vehicle, a fuel cell electric vehicle and a hybrid electric vehicle.

The invention claimed is:

1. A transition metal oxide containing solid solution lithium,
the transition metal oxide comprising:
a transition metal oxide containing lithium being represented by a chemical formula:

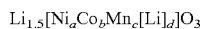

where Li is lithium, Ni is nickel, Co is cobalt, Mn is manganese, O is oxygen, a, b, c and d satisfy relationships: 0<a<1.4; 0≤b<1.4; 0<c<1.4; 0.1<d≤0.4; a+b+c+d=1.5; and 1.1≤a+b+c<1.4,
wherein the transition metal oxide containing lithium includes: a layered structure region;
and a region changed to a spinel structure by being subjected to charge or charge/discharge in a predetermined potential range,
when a ratio of an entire change from $Li_2MnO_3$ with a layered structure in a region to be changed to the spinel structure to $LiMn_2O_4$ with the spinel structure is defined to be 1, a spinel structure change ratio of the transition metal oxide containing lithium is 0.25 or more to less than 1.0,
wherein a BET specific surface area of the transition metal oxide containing lithium is 1 $m^2/g$ or more to 8.0 $m^2/g$ or less, and
a pore volume in the transition metal oxide containing lithium, the pore volume being measured by nitrogen, is 0.025 $cm^3/g$ or less when a relative pressure is 0.98 to 0.99, and
wherein a median diameter (D50) of the transition metal oxide containing lithium is less than 15 μm, and
the transition metal oxide containing lithium includes particles with a particle diameter of less than 1 μm.

2. The transition metal oxide containing solid solution lithium according to claim 1,
wherein a, b, c and d in the chemical formula satisfy relationships: 0<a<1.35; 0≤b<1.35; 0<c<1.35; 0.15<d≤0.35; and 1.15≤a+b+c<1.35, and
the spinel structure change ratio is 0.4 or more to less than 0.9.

3. The transition metal oxide containing solid solution lithium according to claim 1,
wherein a, b, c and d in the chemical formula satisfy relationships: 0<a<1.3; 0≤b<1.3; 0<c<1.3; 0.15<d≤0.35; and 1.2≤a+b+c<1.3, and
the spinel structure change ratio is 0.6 or more to less than 0.8.

4. The transition metal oxide containing solid solution lithium according to claim 1, wherein a liquid absorption amount of the transition metal oxide containing lithium for N-methyl-2-pyrrolidone is 0.5 $cm^3/g$ or less.

5. The transition metal oxide containing solid solution lithium according to claim 1, wherein a true density of the transition metal oxide containing lithium is 4.1 $g/cm^3$ or more to 4.6 $g/cm^3$ or less.

6. A non-aqueous electrolyte secondary battery positive electrode comprising: the transition metal oxide containing solid solution lithium according to claim 1.

7. The non-aqueous electrolyte secondary battery positive electrode according to claim 6, wherein the transition metal oxide containing solid solution lithium obtains the spinel structure change ratio by being subjected to charge or charge/discharge, in which a maximum potential of a positive electrode in the predetermined potential range is 4.3V or more to less than 4.8V in conversion to a lithium metal counter electrode.

8. A non-aqueous electrolyte secondary battery comprising:
the non-aqueous electrolyte secondary battery positive electrode according to claim 6; and
a negative electrode.

9. A transition metal oxide containing solid solution lithium, the transition metal oxide comprising:
a transition metal oxide containing lithium being represented by a chemical formula:

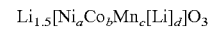

where Li is lithium, Ni is nickel, Co is cobalt, Mn is manganese, O is oxygen, a, b, c and d satisfy relationships: 0<a<1.4; 0≤b<1.4; 0<c<1.4; 0.1<d≤0.4; a+b+c+d=1.5; and 1.1≤a+b+c<1.4,
wherein the transition metal oxide containing lithium includes: a layered structure region; and a region changed to a spinel structure by being subjected to charge or charge/discharge in a predetermined potential range, and when a ratio of an entire change from $Li_2MnO_3$ with a layered structure in a region to be changed to the spinel structure to $LiMn_2O_4$ with the spinel structure is defined to be 1, a spinel structure change ratio of the transition metal oxide containing lithium is 0.25 or more to less than 1.0, wherein the transition metal oxide containing lithium includes: a first transition metal oxide containing lithium, in which a BET specific surface area is 1.0 m$^2$/g or more to 4.0 m$^2$/g or less; and a second transition metal oxide containing lithium, in which a BET specific surface area is more than 4.0 m$^2$/g to 8.0 m$^2$/g or less.

10. The transition metal oxide containing solid solution lithium according to claim 9, wherein a pore volume in the transition metal oxide containing lithium, the pore volume being measured by nitrogen, is 0.025 cm$^3$/g or less when a relative pressure is 0.98 to 0.99.

11. The transition metal oxide containing solid solution lithium according to claim 9, wherein:

a median diameter of the first transition metal oxide containing lithium is less than 15 μm, a median diameter of the second transition metal oxide containing lithium is less than 10 μm, and at least one of the first transition metal oxide containing lithium and the second transition metal oxide containing lithium includes particles with a particle diameter of less than 1 μm.

12. The transition metal oxide containing solid solution lithium according to claim 9, wherein, for N-methyl-2-pyrrolidone, a liquid absorption amount of each of the first transition metal oxide containing lithium and the second transition metal oxide containing lithium is 0.5 cm$^3$/g or less.

13. The transition metal oxide containing solid solution lithium according to claim 9, wherein a true density of each of the first transition metal oxide containing lithium and the second transition metal oxide containing lithium is 4.1 g/cm$^3$ or more to 4.6 g/cm$^3$ or less.

* * * * *